(12) United States Patent
Pennebaker

(10) Patent No.: US 7,901,211 B2
(45) Date of Patent: *Mar. 8, 2011

(54) METHOD OF TREATING AUTISM USING BRAIN JOGGING SYSTEM

(76) Inventor: Shirley M. Pennebaker, LaGrange, GA (US)

( * ) Notice: Subject to any disclaimer, the term of this patent is extended or adjusted under 35 U.S.C. 154(b) by 163 days.

This patent is subject to a terminal disclaimer.

(21) Appl. No.: 12/056,271

(22) Filed: Mar. 26, 2008

(65) Prior Publication Data

US 2008/0241804 A1 Oct. 2, 2008

Related U.S. Application Data

(63) Continuation of application No. 10/656,691, filed on Sep. 4, 2003, now Pat. No. 7,367,807.

(60) Provisional application No. 60/408,483, filed on Sep. 4, 2002.

(51) Int. Cl.
*G09B 19/00* (2006.01)
*G09B 1/00* (2006.01)
*G09B 3/02* (2006.01)
*G06F 17/28* (2006.01)
*G10L 21/06* (2006.01)
*A61B 3/00* (2006.01)

(52) U.S. Cl. ......... 434/167; 434/159; 434/160; 434/161; 434/176; 436/156; 704/3; 704/271; 351/203

(58) Field of Classification Search .................. 434/159, 434/160, 161, 167, 176; 704/3, 271; 351/203
See application file for complete search history.

(56) References Cited

U.S. PATENT DOCUMENTS

| | | |
|---|---|---|
| 3,744,154 A | 7/1973 | Pott |
| 4,695,257 A | 9/1987 | Vawter |
| 5,057,020 A | 10/1991 | Cytanovich |
| 5,135,398 A | 8/1992 | Thornton et al. |
| 5,147,205 A | 9/1992 | Gross et al. |
| 5,256,067 A | 10/1993 | Gildea et al. |
| 5,316,485 A | 5/1994 | Hirose |
| 5,336,093 A | 8/1994 | Cox |
| 5,363,154 A | 11/1994 | Galanter et al. |
| 5,529,498 A | 6/1996 | Cassily et al. |
| 5,562,453 A * | 10/1996 | Wen .............................. 434/185 |

(Continued)

OTHER PUBLICATIONS

Woodcock, R. W, & Johnson, M. B. (1989). Woodcock-Johnson Psychoeducational Battery-Revised. Allen, TX: DLM Teaching Resources.*

(Continued)

*Primary Examiner* — James S Wozniak
*Assistant Examiner* — Paras Shah
(74) *Attorney, Agent, or Firm* — Kilpatrick Townsend & Stockton LLP

(57) ABSTRACT

A computer system provides a series of visual flash stimuli to a user and then requires that the user process the visual stimuli to produce a verbalization that corresponds to the visual stimuli and/or a fine motor activity that corresponds to the visual stimuli. The visual flash stimuli are presented to a user via a display device and include letters, words and phrases. The fine motor activity includes inputting letters or words via an input device, such as typing on a keyboard. The system includes eye movement activities, letter flash activities and word flash activities. The content or visual stimuli provided during these activities, as well as the progression through these activities can be determined in part by the diagnosis of the individual user. The system can be used to treat a variety of mental disabilities.

21 Claims, 31 Drawing Sheets

U.S. PATENT DOCUMENTS

| | | | |
|---|---|---|---|
| 5,743,744 | A | 4/1998 | Cassily et al. |
| 5,813,862 | A * | 9/1998 | Merzenich et al. ............ 434/185 |
| 5,820,379 | A * | 10/1998 | Hall et al. ...................... 434/178 |
| 6,019,607 | A * | 2/2000 | Jenkins et al. ................. 434/116 |
| 6,146,146 | A | 11/2000 | Koby-Olson |
| 6,535,853 | B1 | 3/2003 | Reitano |
| 6,626,679 | B2 | 9/2003 | Skeans et al. |
| 6,755,657 | B1 | 6/2004 | Wasowicz |
| 6,986,663 | B2 | 1/2006 | Budra et al. |
| 2002/0115044 | A1 | 8/2002 | Shpiro |
| 2002/0119429 | A1* | 8/2002 | Barton .......................... 434/178 |
| 2003/0074188 | A1 | 4/2003 | Murata et al. |
| 2005/0064375 | A1* | 3/2005 | Blank ........................... 434/178 |
| 2007/0202474 | A1 | 8/2007 | Miller |

OTHER PUBLICATIONS

Ratcliff, R. et al., A counter model for implicit priming in perceptual word identification, Psychological Review, 1997, 104, 319-343.

Beeman, M. et al., Right and left hemisphere cooperation for drawing predictive and coherence interences during normal story comprehension, Brain Lang 71, 2000, 310-336.

Contest Rules of the 74th Annual Scripps Howard National Spelling Bee in Washington D.C., Scripps Howard National Spelling Bee. http://web.archive.org/web/20010420051017/www.spellingbee.com/rulesdc.shtml, May 2001.

Abstract of Adair, J.C. et al., "Alterations in the functional anatomy of reading induced by rehabilitation of an alexic patient," Neuropsychiatry Neuropsychol Behav Neurol., 13(4), 303-11, 2000.

Abstract of Bookheimer, S.Y, et al., "Activation of language cortex with automatic speech tasks," Neurology, 55 (8), 1151-7, 2000.

Abstract of Fu, S. et al., "Event-related potentials reveal involuntary processing of orientation changes in the visual modality," Psychophysiology, 40 (5), 770-5, 2003.

Absract of Kareken, D.A. et al., "Word rhyming as a probe of hemispheric language dominance with functional magnetic resonance imaging," Neuropsychiatry Neuropsychol Behav Neurol., 13 (4), 264.70, 2000.

Abstract of Makeig, S. et al., "Dynamic brain sources of visual evoked responses," Science, 2002, 295 (5555), 690-4.

EMDR Eye Movement Desensitization and Reprocessing, http://www.emdr.com/frmain01.htm, 2004.

Salk Institute for Biological Studies, "New View of Brain's Inner Workings Opens Research Into Autism, Other Disorders," http://www.salk.edu/news/releases/details.php?id=11, 2002.

Salk Institute for Biological Studies, "Salk Scientists Demonstrate for the First Time That Newly Born Brian Cells Are Functional in the Adult Brain," http://www.salk.edu/news/releases/details.php?id=10, 2002.

Salk Institute for Biological Studies, "Salk Researchers Find That Brain Receptor May Be Involved in Epileptic Seizures," http://www.salk.edu/news/releases/details.php?id=58, 1998.

Enchanted Mind, "The Quantum Mechanical Brain & Creativity," http://enchantedmind.com/html/sciencequantum_brain.html, 1996.

Fox, Peter T. et al., "Brain correlates of stuttering and syllable production, A PET performance-correlation analysis," Brain, 2000, 123, 1985-2004.

Hook, Pamela E. et al., "The Importance of Automaticity and Fluency for Efficient Reading Comprehension," Perspectives, Winter 2002, 9-14.

* cited by examiner

METHOD OF TREATING AUTISM USING BRAIN JOGGING SYSTEM

RELATED APPLICATION

This patent application is a continuation application of U.S. application Ser. No. 10/656,691 entitled "Method for Improving Word Processing Skills Using Visual Flash Stimuli" filed Sep. 4, 2003, which application claims priority to U.S. Provisional Application No. 60/408,483 entitled "Systems and Methods for Brain Jogging" filed Sep. 4, 2002, both of which are incorporated herein by reference.

FIELD OF THE INVENTION

The invention relates generally to systems and methods for performing mental exercises and, more particularly, to computer-implemented systems and methods for use in performing mental exercises to treat disorders, such as mentally intellectually impaired disorder ("MIID"), autism, seizures, dyslexia, enuresis and Tourette syndrome, as well as to assist with the rehabilitation of stroke victims.

BACKGROUND

Many people suffer from some type of injury, disability, or impairment to their brain (hereinafter generally referred to as a mental disability). The term mental disability is intended to be a broad term encompassing such things as epilepsy, traumatic brain injury, depression, obsessive compulsive disorders, learning disabilities, dyslexia, seizure disorders, stroke victims, Alzheimer's Diseases, motor difficulties, emotionally behavioral disorders, and even low intelligence quotients (IQ), including mentally intellectually impaired disorder ("MIID") and slow learners. While these mental disabilities all differ in their precise symptoms, many of these mental disabilities share common symptoms relating to language processing, be it expressive or receptive, related to written or spoken language processing as an impaired ability to retrieve and/or express, process and retain information in short or long term memory or to utilize working memory. For example, traumatic brain injury may result in a loss of flexibility in thinking and processing information or in aphasia, the loss of the facility of speech or of connecting words and ideas. While often times the speech organs and general intelligence remain unaffected, reading, writing, calculating, and other processing skills are affected. Other common symptoms include the inability to use or understand words, problems with comprehension or grammatical correctness when writing, reading or speaking, the inability to focus visual attention, defects in vision, short and or long-term memory loss, just to name a few. For dyslexia, symptoms include a disturbance of the ability to read, as well as difficulty in reading, spelling, writing, math, auditory processing, problems with organizational skills, and loss of memory.

For attention deficit hyperactivity disorder (ADHD), a perceived problem is the disruption of working memory. In "Effects of ADHD on Neural Correlates of Working Memory: A Positron Emission Tomography Study," J. B. Schweitzer, J. M. Hoffman, L. Tune, S. T. Grafton, and C. D. Kilts of the Depts. of Psychiatry, Neurology, & Emory PET Center, Emory University, Atlanta, Ga. 30322 reported that researchers at Emory University discovered "less efficient use of the prefrontal cortex in patients than in matched controls. ADHD patients scored lower on numeric tasks." "Persons with ADHD tend to integrate information in more visual and less auditory ways," according to Julie Schweitzer, an assistant professor of psychiatry and behavioral sciences. She also said that "the details of these types of findings will be of interest to . . . educators designing teaching tools for children and adults with ADHD." In the study, Schweitzer took brain scans of six ADHD men and six control men while they performed an auditory arithmetic task. Schweitzer found efficient use of prefrontal cortex in control subjects and much less efficient use of that region in the ADHD subjects.

The problems and challenges associated with these mental disabilities can have severe consequences on a person's quality of life. Disruptions of working memory may explain the many difficulties individuals with ADHD encounter, from laborious reading to forgetting to finish multiple chores. "Results from the current study suggest that use of two subsidiary processes of working memory may be disrupted in ADHD: the phonological loop and the visuo-spatial sketchpad process," Schweitzer says. "Group differences may reflect a disruption in allocation of attention and use of a central executive system by subjects with ADHD, which in turn alters the use and efficiency of the subsidiary process of working memory." A syndrome of learning and behavioral problems that is not caused by any serious underlying physical or mental disorder and is characterized by difficulty in sustaining attention by impulsive behavior, such as speaking out of turn or excessive activity is referred to a minimal brain dysfunction (Merriam Webster's Medical Dictionary).

For children, the mental disability may interfere with that child's ability to function and behave in school. Children may suffer academically in that they are unable to keep up with their belongings and homework assignments, and are generally more disorganized than other students of their same age and/or grade. Their grades may suffer which often instills a low self-esteem and high level of frustration. The difficulty in school may become so severe that too many of these children will flunk out of school, simply drop out of school, or change classification under public school guidelines to emotionally behaviorally disordered.

The problems facing children, as well as people of all ages, with mental disabilities extend beyond just classroom. Many of these people have difficulty interacting with other people and a low level of social development. Neurological disorders often times impede language and derail social and emotional development. For example, day dreaming, fantasizing, experiencing delusions, and hallucinations, accompanied by marked withdrawal from reality is common. People may have difficulty with daily activities, such as being on time for work or appointments, remembering to take medicines, completing job related assignments, returning telephone calls, timely bill paying, maintaining an orderly and clean house, and personal hygiene. In fact, the social problems for some may be so severe as to cause them to enter juvenile systems or even prison.

Systems and methods have been developed to assist with learning disabilities. For example, U.S. Pat. No. 4,695,257 to Vawter, U.S. Pat. No. 5,336,093 to Cox, U.S. Pat. No. 5,009,603 to Fong et al., U.S. Pat. No. 5,135,398 to Thornton et al., U.S. Pat. No. 5,256,067 to Gildea et al., and U.S. Pat. No. 5,316,485 to Hirose are examples of such systems, all of which are incorporated herein by reference. These systems and methods are intended to assist in teaching reading, writing, and mathematics. A typical approach with these types of systems and methods is to incorporate conventional classroom techniques into a game or a computer program. These conventional teaching methods have already been proven to be ineffective in reaching these students whereby implementing these methods into a computer program would have a low chance of success.

A need therefore exists for improved methods and systems for assisting people with mental disabilities, in the areas of cognitive processing that appear to be hindering them from meeting the mental, emotional, behavioral, and academic demands of and especially helping children with the demands placed upon them through school and elsewhere.

SUMMARY

The present invention provides a system and method for performing mental exercises to treat mental disabilities. The present invention provides a computer system that provides a series of visual flash stimuli to a user and then requires that the user process the visual stimuli to produce a verbalization that corresponds to the visual stimuli and/or a fine motor activity that corresponds to the visual stimuli. The visual flash stimuli are presented to a user via a display device and include incongruent letters, words and phrases, including rhyming words and phrases. Preferably the visual flash stimuli is presented using high contrast, such as black lettering on a white background. The fine motor activity includes inputting letters or words via an input device, such as typing on a keyboard.

The system includes eye movement activities, letter flash activities and word flash activities. Each of these activities provides some form of visual flash stimuli which evokes a response from the user. For example, the letter flash activities display letters to a user and the word flash activities display words to a user. The eye movement activities display phrases, prose, definitions, words or word components to a user. The content provided during these activities, as well as the progression through these activities can be determined in part by the diagnosis of the individual user. Thus, the content and progression of a student who is MIID, autistic or language processing disordered as a result of stroke may be different than a student who is dyslexic.

These and other aspects, features and advantages of the present invention may be more clearly understood and appreciated from a review of the following detailed description of the disclosed embodiments and by reference to the appended drawings and claims.

BRIEF DESCRIPTION OF DRAWINGS

The accompanying drawings, which are incorporated in and form a part of the specification, illustrate preferred embodiments of the present invention and, together with the description, disclose the principles of the invention. In the drawings.

DETAILED DESCRIPTION

Figure 1:
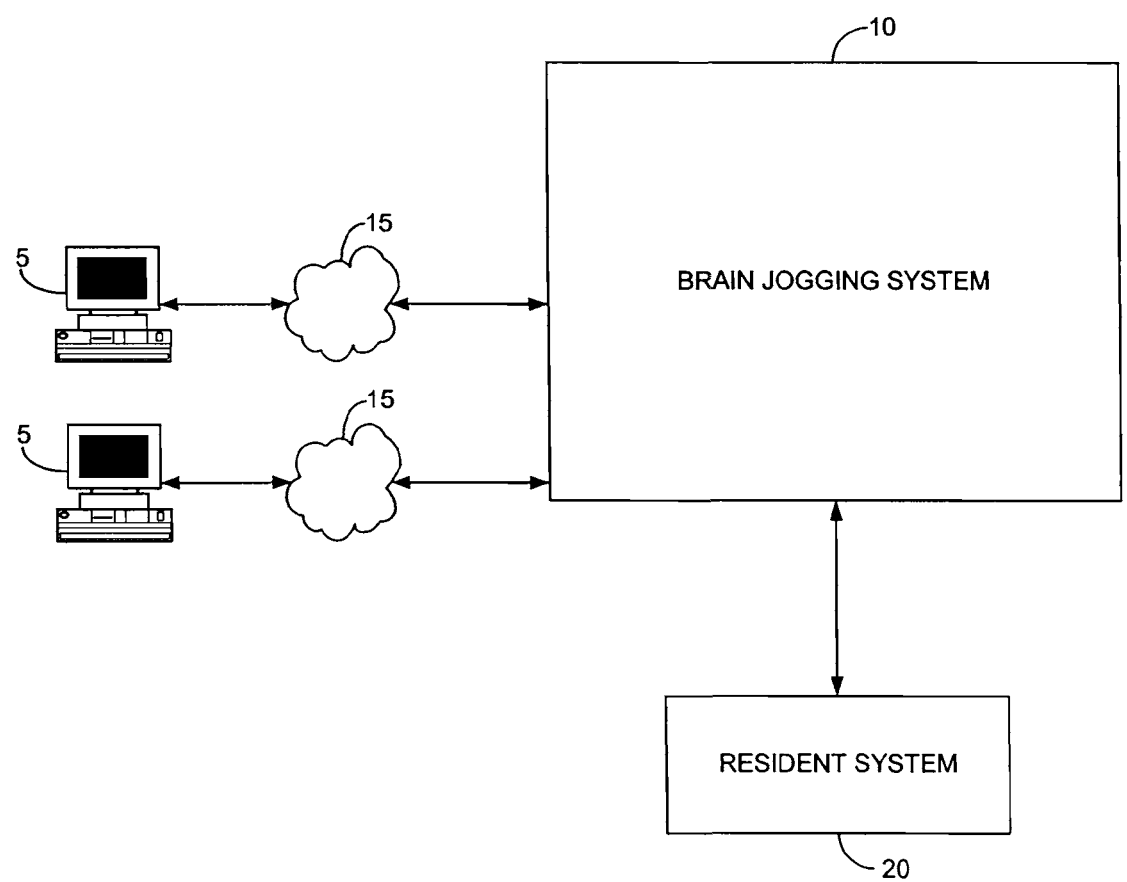
FIG. 1 is a network according to a preferred embodiment of the invention having a system for exercising the brain.

A network according to a preferred embodiment of the invention will now be described with reference to FIG. 1. The network includes a brain jogging system 10, various user interfaces 5, and possibly a resident system 20. The brain jogging system 10 can be used in a variety of different ways. For example, the brain jogging system 10 may be resident on a single device, such as personal computer, for use only at that one computer. As another example, the brain jogging system 10 may be accessible through a network 15. This network 15 may be any type of network, including but not limited to a local area network (LAN), a wide area network (WAN), or the Internet as an application service provider (ASP). Thus, the brain jogging system 10 may be used within an organization, such as a hospital, school, or university. The network 15, as mentioned above, may comprise any type of network including mobile radiotelephone networks, 3G networks, a WiFi, cable network, or satellite network, just to name a few. The user interfaces 5 are represented as personal computers but are not limited to just these types of devices. Instead, the user interface 5 may be implemented on a personal communicator, mobile radiotelephone, personal digital assistant (PDA), pocket PC, WebTV, or other communication, data, or entertainment devices.

The resident system 20 may be present in some applications of the brain jogging system 10. For example, in a school system, the resident system 20 may be used to store and analyze information on students' attendance, grades, and disciplinary actions. The brain jogging system 10 may interface with the resident system 20 to identify students who may benefit from the brain jogging system 10. The brain jogging system 10 may also interface with the resident system 20 to monitor the progress of students currently using the brain jogging system 10 and in analyzing the effectiveness of the brain jogging system 10. The resident system 20 may also access the records and other information stored within the brain jogging system 10.

The brain jogging system 10 is believed to be beneficial and has been proven to be beneficial to individuals with minimal brain dysfunction and a wide variety of mental disabilities. For example, individuals who are MIID, depressed, obsessive compulsive disordered, learning disabled having difficulty in learning a basic scholastic skill, especially reading, reading comprehension, writing, or arithmetic, because of a psychological or organic disorder, such as dyslexia or attention deficit disorder, that interferes with the learning process, which includes language disordered, autistic, Asperger's syndrome, dyslexic, and attention deficit disorder with and without hyperactivity, atypical attention deficit disorder, traumatically brain injured, seizure disordered, stroke victims, early and mild Alzheimer's Disease, motor skills such as walking, speaking, tremors, and other fine motor skills, encopresis (involuntary defecation of psychic origin) (Merriam-Webster's Medical Dictionary 1995), enuresis (bedwetting), emotionally behaviorally disordered which includes those having difficulty sustaining attention, controlling impulsivity and distractibility, including, but not limited to involuntary tics and by uncontrollable verbalizations including echolalia and Tourette syndrome, those with borderline IQs and those falling "between the cracks" with IQs too high to be considered MIID and too low to be considered of average intelligence, also called slow learners and thus ineligible for special education services, and language processing difficulties what is currently considered the "classical" pattern of transcortical sensory aphasia (TCSA). This list is not intended to be comprehensive as other disabilities, diseases, injuries, and other disorders will likely be found to benefit from the brain jogging system 10 with further research.

The brain jogging system 10 works through the synchronization of sight, sound, and motion/fine motor movement. The brain jogging system 10 has been proven to be effective and the medical literature also provides support for its methodology. Dr. Charles Stevens of the Salk Institute for Biological Studies ("Salk Institute") has shown that synaptic transmission is based on synapses, specialized points of contact between adjacent nerve cells across which nerve cells communicate. Synapses are found at the end of axons, the part of the nerve cells that act as (wires) extending to adjacent nerve cells. Communication across the tiny gap between the sending and receiving cells is accomplished by employing transmitters and receptors. The cell on the sending end of the synapse contains packets full of neuron transmitter molecules which are released when an impulse reaches the end of a nerve. These transmitter molecules travel across the gap and attach to the receptors on adjacent cells. As between a lock and a key, the binding is highly specific, each neuro transmitter recognizes and grabs hold of only a specific type of receptor. Changes in the strength of the synapse are one of the most important ways in which neural circuits adapt, and are therefore of great significant in learning and memory.

The connections between nerve cells are not static. Dr. Stevens has found instead, that their efficiency can vary over time in response to use. The synapses in a frequently used circuit will gradually become more proficient in transmission, and the task will be accomplished more easily. Since language is localized in the brain (Broca's and Wernicke's areas), it is advantageous to target those areas for more proficiency in transmission so that the tasks of speaking, learning, and memory will become a frequently used circuit. The exercises provided through the brain jogging system 10 are thus designed to stimulate certain areas of the brain in order to enhance learning and processing.

A Jan. 24, 2002 press release from the Salk Institute comments upon a reported study, "Dynamic Brain Sources of Visual Evoked Responses," Science, Volume 295, Number 5555, 25 Jan. 2002, pp. 690-694, S. Makeig, W. Westerfield, T. P. Jung, S. Enghoff, J. Topwnsend, E. Courchesne and T. J. Sejnowski. The press release states that the study discovered seven independent sources of brain waves that "adjust their signals following a flashed stimulus . . . . The way doctors or paramedics get the heart beating again is to shock it, which resets the pacemakers to act in phase with one another. In the brain, a stimulus acts similarly, re-setting the phase of the oscillations and bringing them into synchrony, albeit briefly."

An Apr. 25, 2001 press release from the Salk Institute comments upon a study entitled "Distinct Roles of Nerve and Muscle in Postsynaptic Differentiation of the Neuromuscular Synapse," K. F. Lee, W. Lin, B. Dominguez, S. Pfaff, R. Burgess and J. Sanes. The press release states that the study discovered that "the formation of neuromuscular synapses is triggered by cues in muscle cells." The study provided the "first evidence that muscles can initiate synapse formation completely in the absence of nerve stimulation." The study's finding "has implications for attempts to reconstitute a functional nervous system in cases like spinal cord injury."

A Nov. 8, 1999 press release from the Salk Institute comments upon a study entitled "Running Enhances Neurogenesis, Learning and Long-term Potentiation in Mice," F. H. Gage and B. R. Christie. The press release states that the study compared mice housed in standard cages with food and water only to mice with access to a running wheel. After approximates six weeks, the mice were tested and the "mice that ran leaned significantly better than their sedentary counterparts." The mice that ran also "had grown more cells than their litter mates." Salk Institute Professor Fred Gage commented that the study taken together with earlier studies suggests that "one's behavior can change the structure of the brain, and that these changes can in turn affect how we behave in our environment."

In the 2001 journal Aphasiology, 2001, Marcelo L. Berthier from the University of Malaga, found unexpected brain-language relationships in aphasia and found evidence from transcortical sensory aphasia associated with fontal lobe lesions. As set forth in this article, "[d]yslexia rehabilitation may facilitate right-hemisphere cortical networks in the reading process and increase engagement of phonologic articulatory motor representations in Broca's area." Word rhyming produced greater left-hemisphere activation than right-hemisphere activation. Foci of rhyme-related activation were found in the left Brodmann's area (BA) 44 (Broca's area), left dorsolateral prefrontal cortex (BA 9/46 and BA 8/9, left middle temporal gyrus (BA 22), and left fusiform gyrus (BA 37) in the posterior basal temporal lobe. Activation associated with the control task was present in the right parietal area and in the right temporal and left parietal regions. "Subvocal word rhyming activates dominant perisylvian cortical region."

One study that required participants to respond to a central stimulus used colored circle stimuli and letter stimuli. Regions within the middle frontal gyri of both hemispheres exhibited more competition-related activation for the letter stimuli. The border of the right middle frontal and inferior frontal gyri and the anterior cingulated cortex (acc) were significantly activated by competition for both types of stimuli. The left inferior parietal cortex showed competition-related activation for the letter stimuli. "Material Dependent and Material-Independent Selection Processes in the Frontal and Parietal Lobes: An event-related fMRI Investigation of Response Competition," Neuropsychologia 41 (2003), pp. 1208-1217.

These articles provide support that the methodology involved in the brain jogging system 10 works to "activate" various portions of the brain required for learning and memory. The brain jogging system reorganizes the brain wave patterns and initiates the synapse formation, much like a pacemaker reorganizes the heart's pattern, by combining eye movement with a visual flash stimulus. The eye movement activities of the brain jogging system involve the optic nerve and muscle and are designed to stimulate synapse formation.

These articles are merely exemplary and are not intended to represent all support in the medical literature. However, they validate the use of the letter flash activity of the brain jogging system to enhance brain cell development and to reset brain wave patterns for overcoming strokes, seizures, autism, Tourette syndrome, central auditory processing disorders, disorders of visual discrimination/visual memory, pervasive developmental language disorders, aphasia, and anomia, by enhancing learning and memory. The eye movement activity enhances synapse formation.

As is apparent from the partial list of mental disabilities discussed above, the brain jogging system 10 can be used in different settings depending upon the individual and the mental disability. For the purposes of this description, the setting for the brain jogging system 10 is in an academic institution learning center, remedial center, medical center or rehabilitation facility where the users 5 include students as well as faculty, administrators rehabilitation physicians, therapists and assistants. This program may also be used as a "maintenance program" for daily use at home or by students in a home schooling environment.

The brain jogging system 10 utilizes technology to facilitate overall learning potential be it a skill for motor coordination, memory, comprehension, visual motor, visual perception, visual discrimination, increased peripheral fields, by synchronizing the timing of vision, speech and fine motor movement/motion. "When the pupil is ready, the teacher will appear." The brain jogging system 10 "readies the pupil." This is a revolutionary approach to learning. As a rehabilitation physician stated, this "approach will make an average learner advanced, and a slow learner at least average." The brain jogging system 10 targets the central visual processing skills. One current approach to rehabilitation is "Constraint Induced Therapy Plus" for rehabilitation patients. This approach restricts the patient's good arm and forces the patient to force their minds to make demands on their atrophied arm. The brain jogging system 10 is sending impulses to the bad arm, so to speak by awaking the cognitive processes and stimulating synapse formation. The brain jogging system 10 is like a coach is to a sport. The other programs like those described in the Cox patent utilize technology to facilitate specific academic skills alone such as reading gains.

Brain Jogging System

Figure 2:
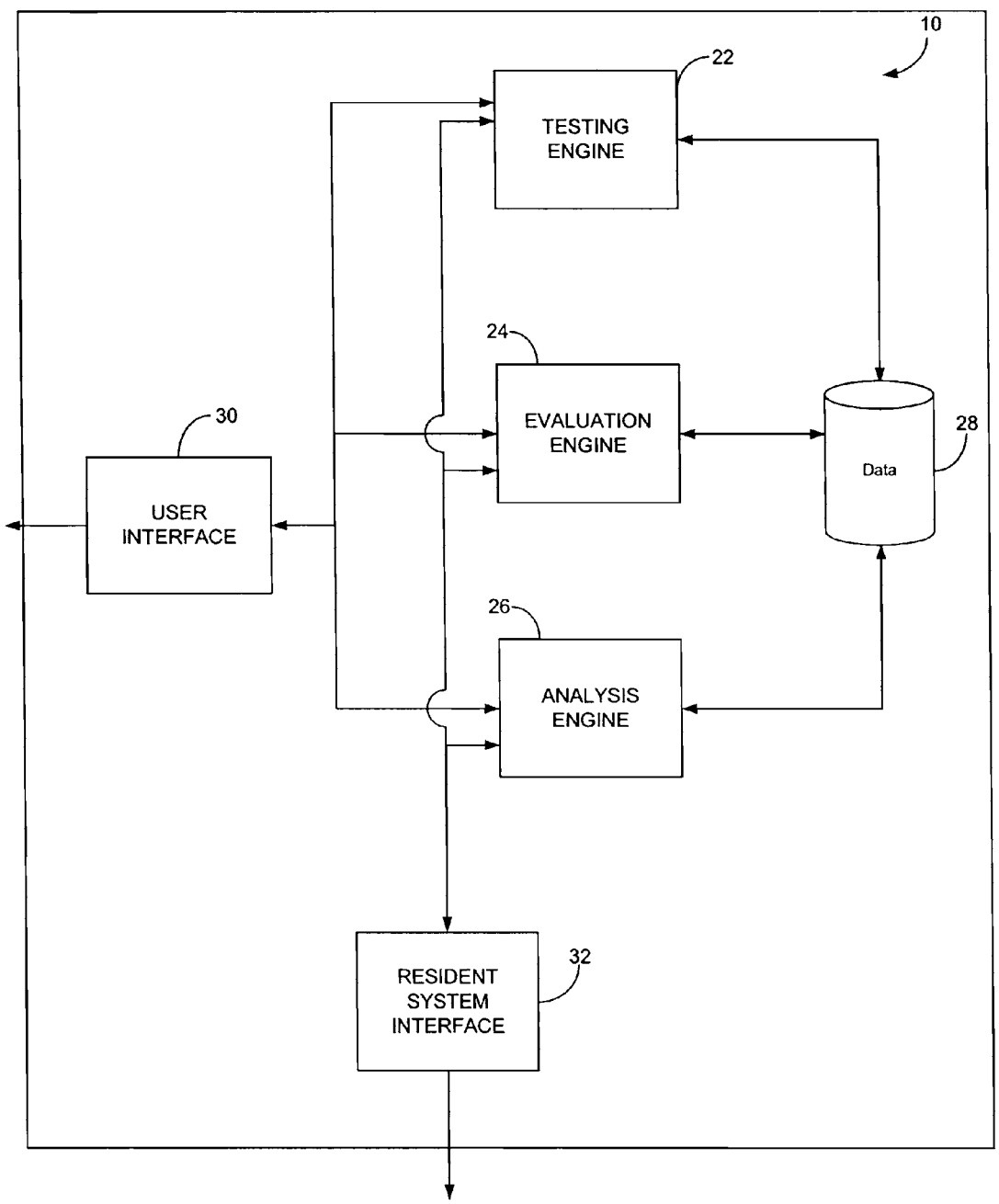
FIG. 2 is a more detailed block diagram of the systems shown in FIG. 1.

A representative functional block diagram of the brain jogging system 10 is shown in FIG. 2. The brain jogging system 10 includes an evaluation engine 24, which is used in evaluating users of the system 10. As will become apparent from the description below, the evaluation engine 24 is used to assess the skill level of an individual and also to select desired exercises for the individual based on that evaluation. The brain jogging system 10 also includes a testing engine 22 for providing the mental exercises to the user 5. The brain jogging system 10 includes an analysis engine 26, which monitors and analyzes the progress of a student in performing the mental exercises. The brain jogging system 10 also includes a database 28 for use by the engines 22, 24, and 26 in performing their functions. The brain jogging system 10 also includes a user interface 30 for interfacing with the users 5 and also a resident system interface 32 for interfacing with the resident system 20. While the brain jogging system 10 has been shown to include these various components, this diagram merely represents the functions available through the brain jogging system 10 and is not intended to be limiting to this particular design or architecture for the system 10.

Interfaces to the Brain Jogging System

Figure 3:
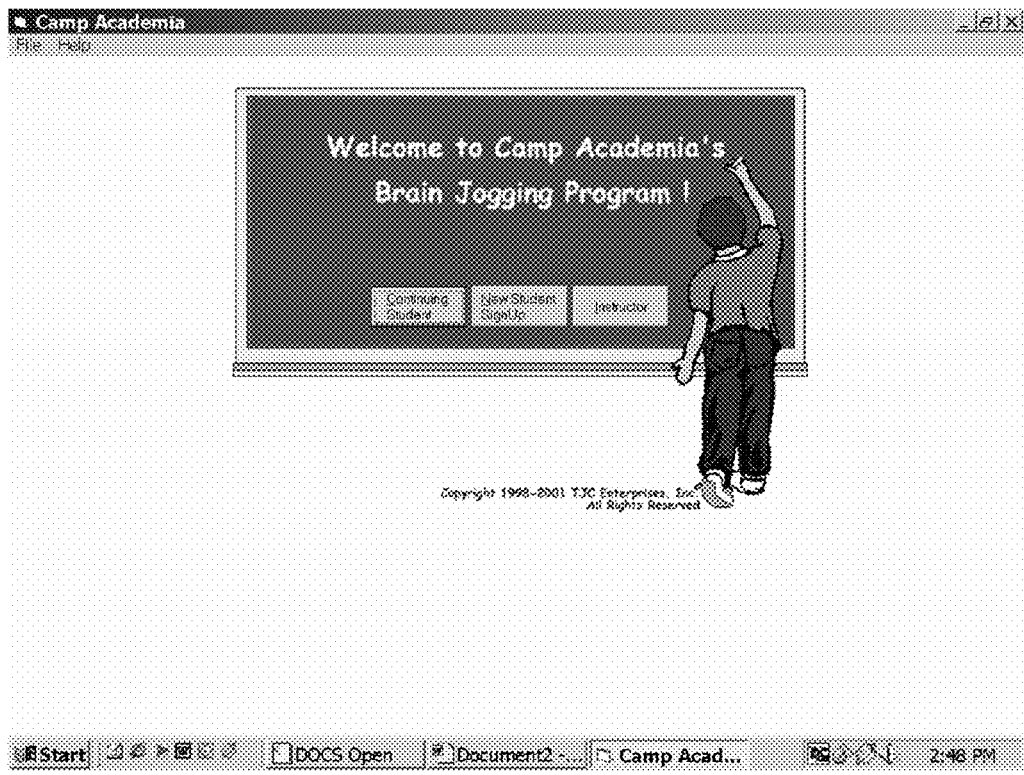
FIG. 3 is a main interface to the system.

An explanation will now be given with reference to a preferred set of interfaces to the brain jogging system 10. FIG. 3 provides a main interface to the system 10 which allows the user to enter as a "Continuing Student," a "New Student," or as an "Instructor."

Figure 4:
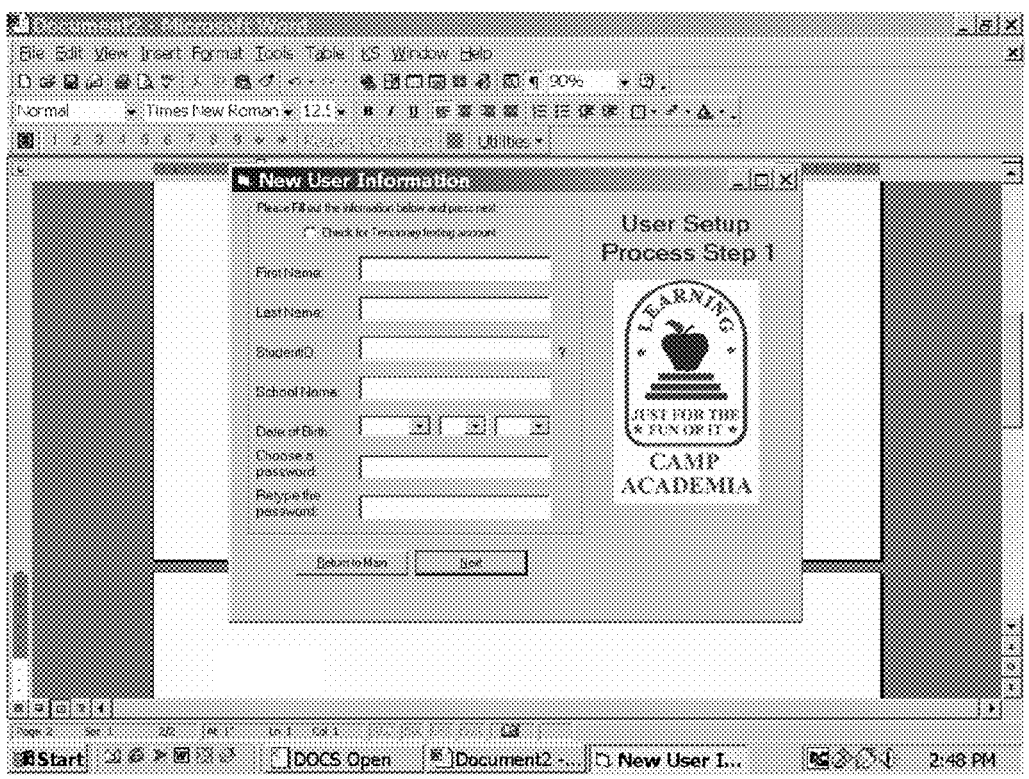
FIG. 4 is an interface for entering new user information.
Figure 5A:
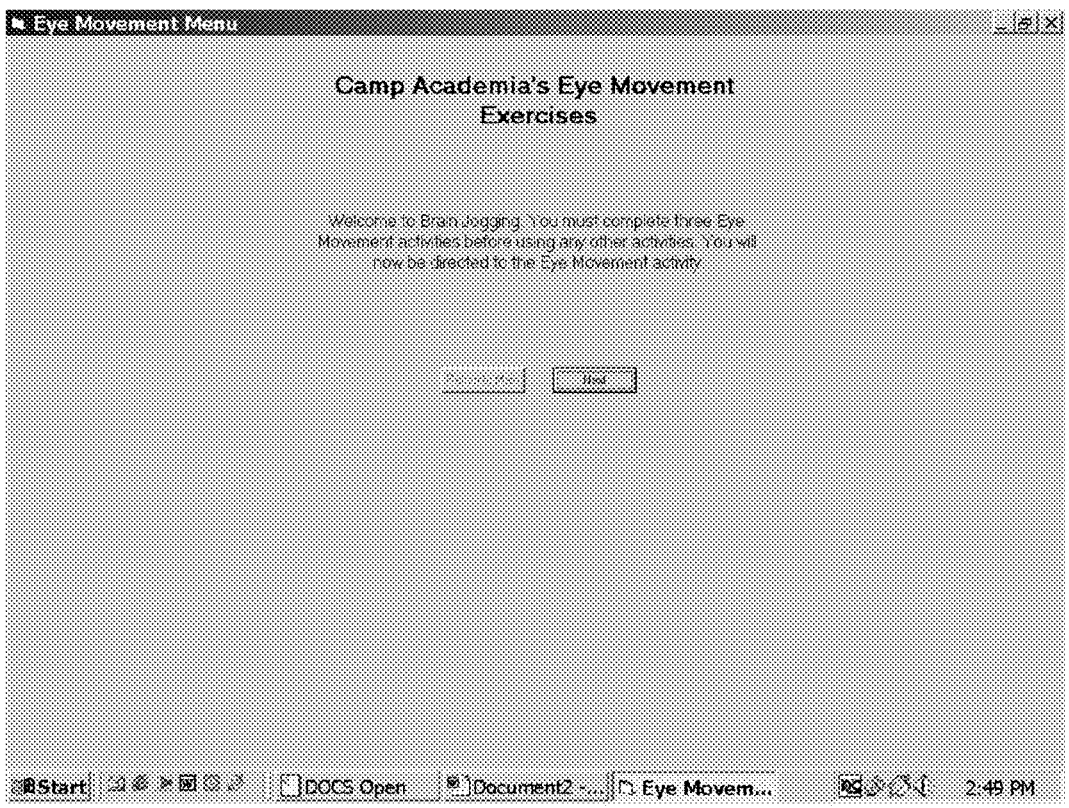
FIG. 5(A) is an interface for beginning a session.

If the person selects the "New Student Sign Up" button, the user is presented with the interface shown in FIG. 4 in which the user is prompted to enter user information. This information includes the name, student ID, school name, date of birth, and password. Once the new student signs up a base line is established for the new student. FIG. 5(A) illustrates establishing a base line for a new student. First the new student is directed to the eye movement activity. In FIG. 5(A) the new student is informed that they must perform three eye movement activities before proceeding further.

The user then proceeds to perform the eye movement activity. The initial eye movement activity requires the user to identify the first and last letter on the far right and left of the screen by verbalizing the letters. Additional details on the eye movement activity are provided in the section entitled Eye Movement Activity. In one embodiment, an instructor observes the user. In an alternate embodiment, the brain jogging system 10 is capable of monitoring the user's performance.

The new student next proceeds to repeat the eye movement activity, but this time the student verbalizes the first word, spells the first word, verbalizes the first word again, verbalizes the last word, spells the last word, and verbalizes the last word again.

Once the new student has completed the eye movement activities, the evaluation process proceeds to the letter flash activity. The student begins with two-letter flash exercises. Two letters appear for two seconds and then disappear. The student is instructed to input the letters using an input device, such as a keyboard or tablet, attached to the brain jogging system. The system displays the letters flashed and the letters input by the student and informs the student if the letters input were correct. Additional details on letter flash exercises are provided in the section entitled Letter Flash Activity. Additional sets of letters are flashed at an increasing speed until the student misses three consecutive attempts or until the highest speed is completed three times. If the student successfully completes the highest speed for the two-letter flash exercises, then the student proceeds on to three-letter flash exercises. If the student successfully completes the highest speed for the three-letter flash exercises, then the student proceeds to four-letter flash exercises. The brain jogging program records the results of the letter flash activity. The results are evaluated by an instructor or the system and are used to establish a base line for the student. The base line determines what exercises the student should perform the next time the student uses the brain jogging system.

As will become more apparent from the description below, as the users progress through the letter flash activities and the word flash activities, the brain jogging system 10 provides the mental exercises at a faster speed. The numbers 1 through 9 represent increasingly faster speeds at which the mental exercises are presented to the user. As will be apparent to those skilled in the art, the number of speeds and actual speed may vary. Any suitable manner of increasing the speeds may be used and are preferably set considering the capabilities of the targeted users.

In one embodiment, the low end speed was set by working with the most severely challenged learners such as stroke victims and other extremely challenged learners. The presentation speed for the low end is 3000 milliseconds. The high-end speed is 333 milliseconds and was set working with the best learners. This high speed is at a level where the best learners could actually achieve while still challenging them. The equation takes 3000 milliseconds and divides it by the speed chosen by the user. For example, if the user input "5" as the desired speed, the speed would be 3000 milliseconds divided by 5, or 600 milliseconds. This equation is effective because it follows the natural student's progress which is a rapid improvement at first. As the student moves forward in his ability, the speed differences lessen to allow the student to fine tone his efforts.

Figure 5B:
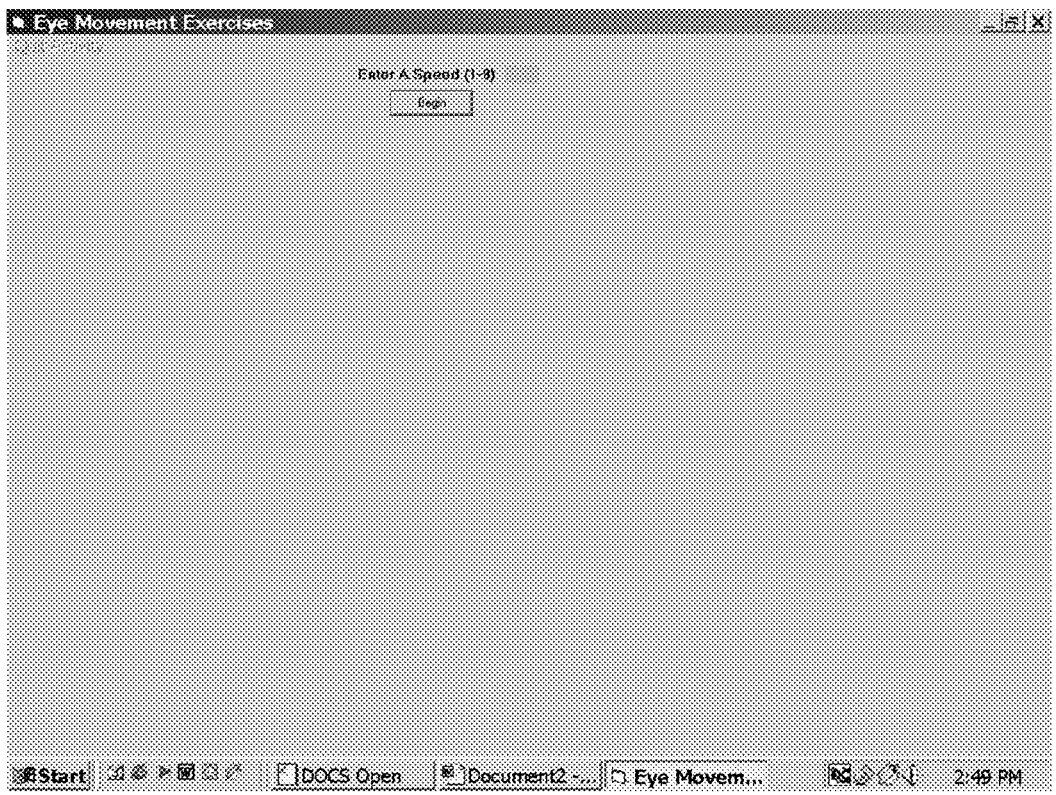
FIG. 5(B) is an interface presented upon selecting a "New Student Sign Up" option in the interface shown in FIG. 3.

If the person selects the "Continuing Student" button at the main interface, the user is presented with the interface shown in FIG. 5(B). A continuing student is instructed to perform three eye movement activities before proceeding to other activities. In one embodiment, the student or instructor selects the activity that follows the eye movement activities. In another embodiment, the evaluation engine 24 selects a set of exercises by considering factors, that include, but are not limited to, the student's performance in a previous brain jogging session. For example, the evaluation engine 24 may factor in the specific diagnosis for an individual with certain exercises or groups of exercises being more suitable for one diagnosis than other diagnoses. The evaluation engine 24 may accept input 10 from other systems, such as from neuro-imaging, brain mapping, functional magnetic resonance imaging (fMRI) which essentially is neuro-imaging allowing someone to literally watch as a person thinks, and other scientific measurements or observations. The evaluation engine 24 may also accept input from a trained individual in order to define the desired exercises or groups of exercises. This input is preferably derived from someone who has not only knowledge of the diagnoses and the manner in which it affects the user but also has knowledge of how the exercises alter the user's brain. Furthermore, the input may be derived from the input of several individuals, such as teachers, medical professionals, family members, and the user. All of this input not only may be used during evaluation but also after exercises have been performed to monitor a person's progress and to analyze the efficacy of the system 10.

Administrator/Teacher Login

Figure 5C:
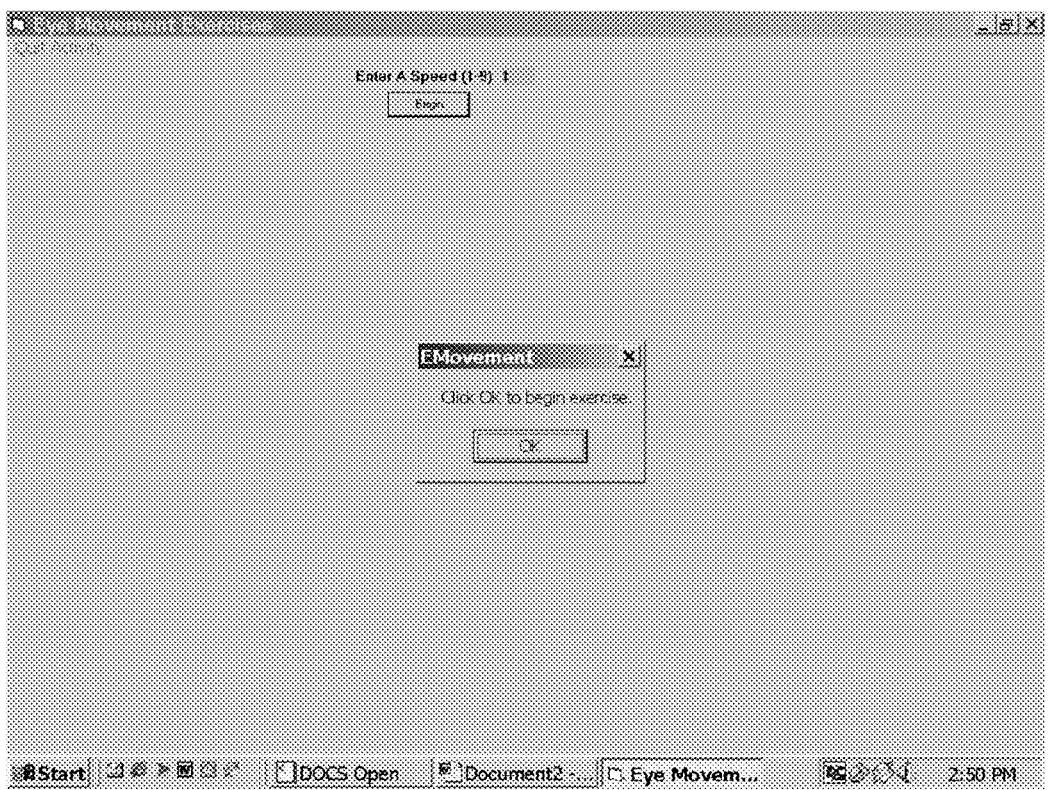
FIG. 5(C) is an interface presented by the system upon selecting the "Instructor" option from the interface shown in FIG. 3.
Figure 5D:
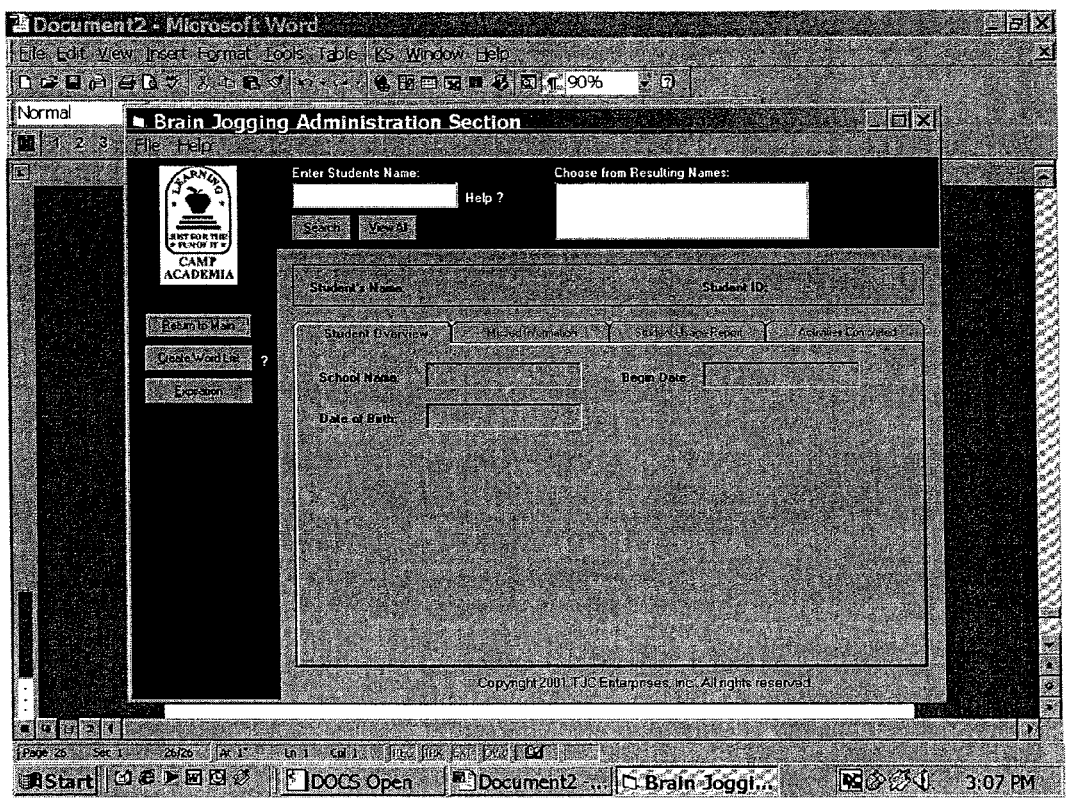
FIGS. 5(D) to 5(K) provide examples of interfaces presented by the system to an instructor.
Figure 5E:
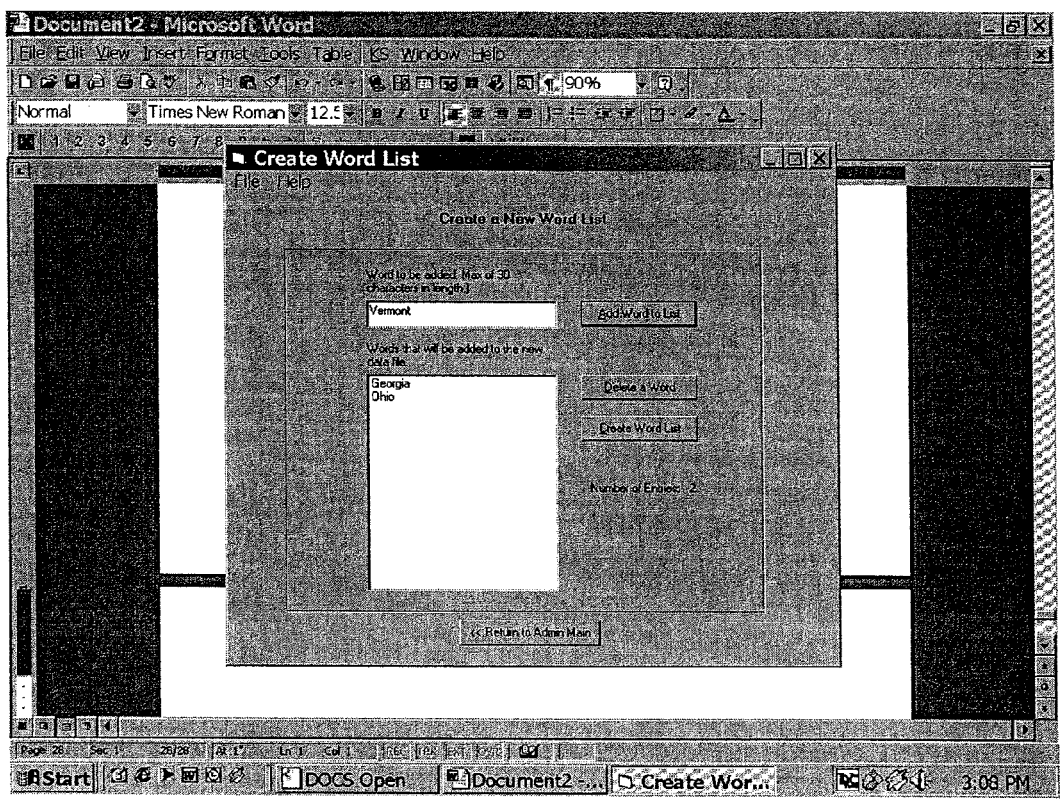
Figure 5F:
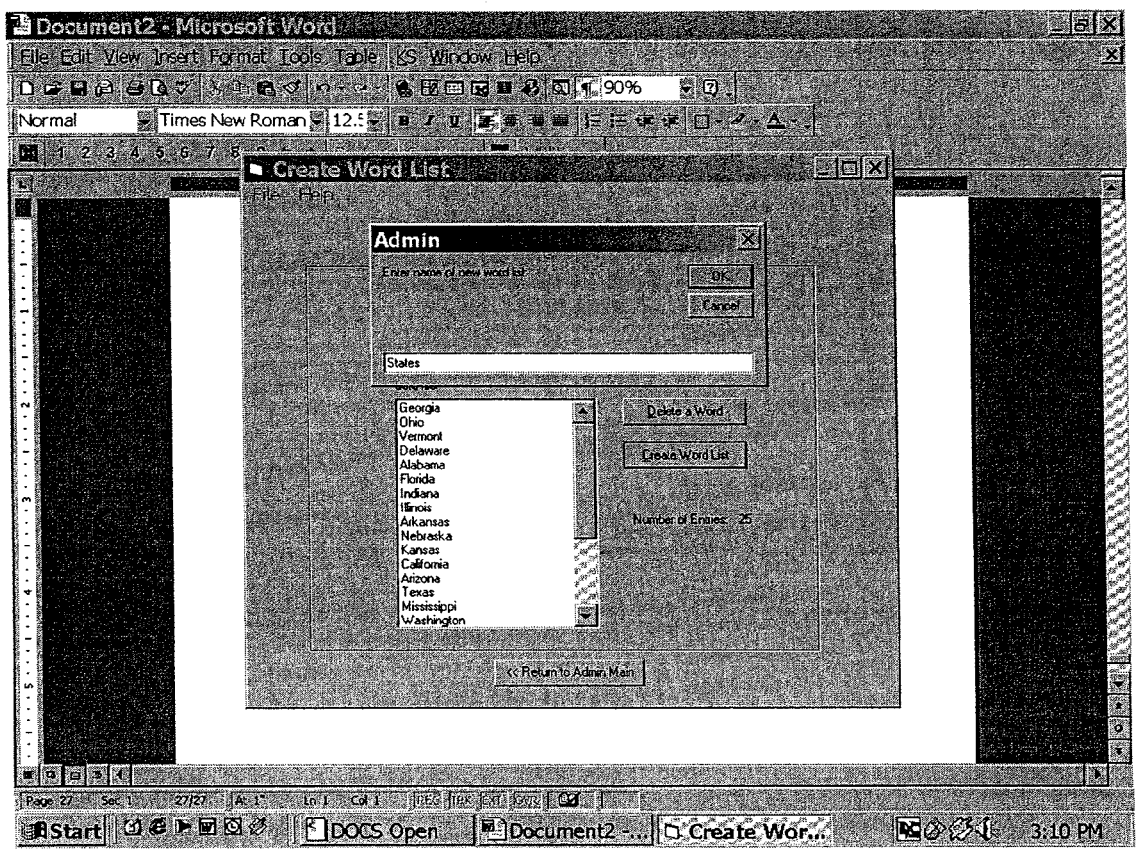

FIG. 5(C) is an example of the login for an administrator or teacher upon selection of the "Instructor" button in FIG. 3. After the instructor login, the user is presented with the interface shown in FIG. 5(D). Through this interface, the user can create a new list of words by selecting the "Create Word List" button. Upon selecting this button, the user receives the interface shown in FIG. 5(E) where the user can input words into the word list. In this embodiment, the minimum number of words for a word list is 25, although in other embodiments it may be a greater or smaller number. After the user is done inputting words, the user receivers the interface shown in FIG. 5(F) where the name of the word list is entered. The user may also select the "Expiration" button in the interface shown in FIG. 5(G) to set the expiration date for the program.

Figure 5G:
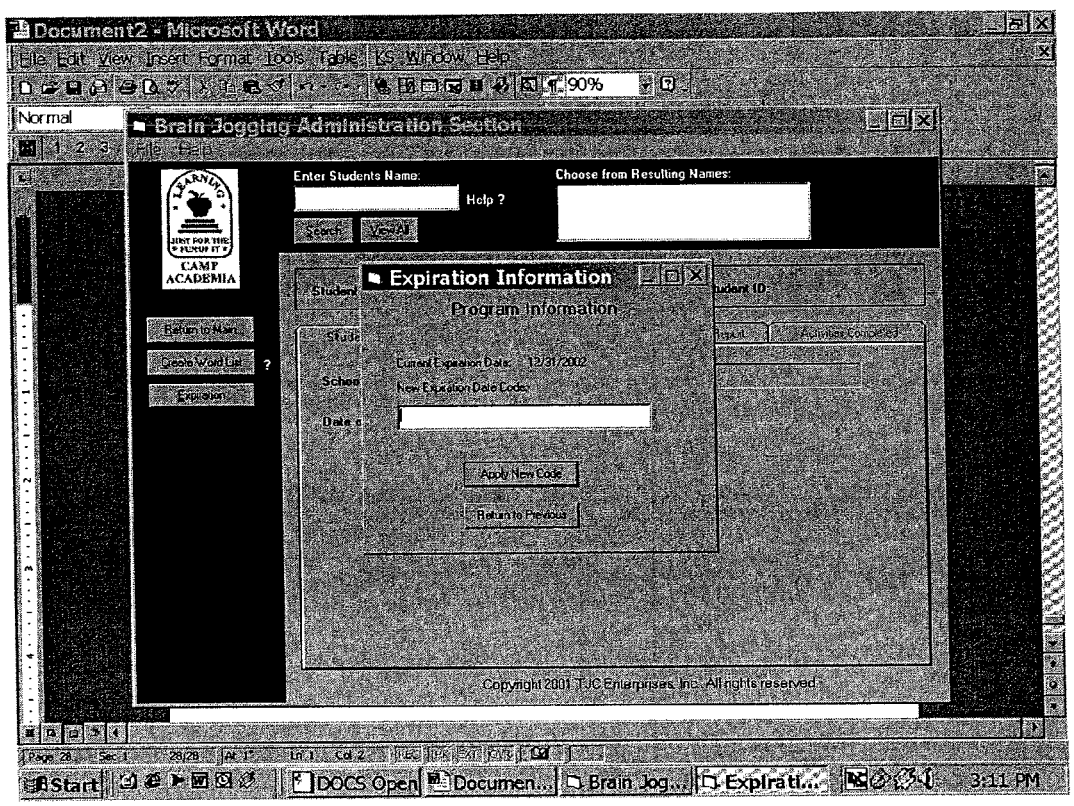
Figure 5H:
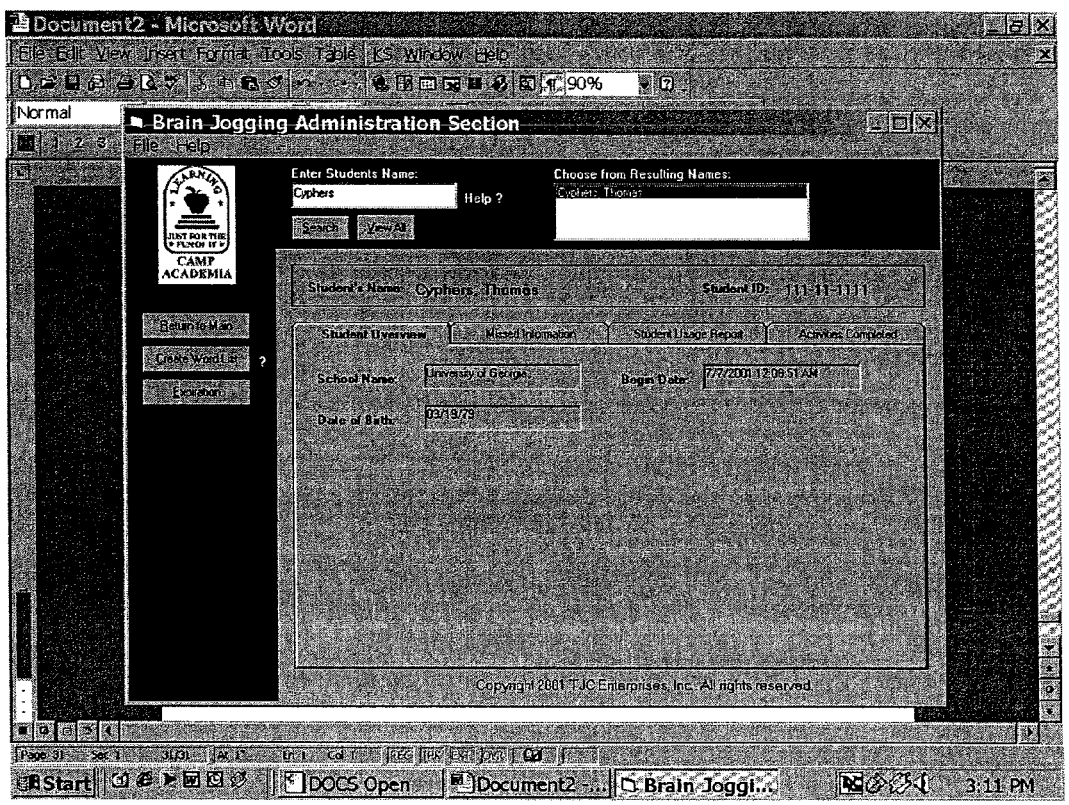
Figure 5I:
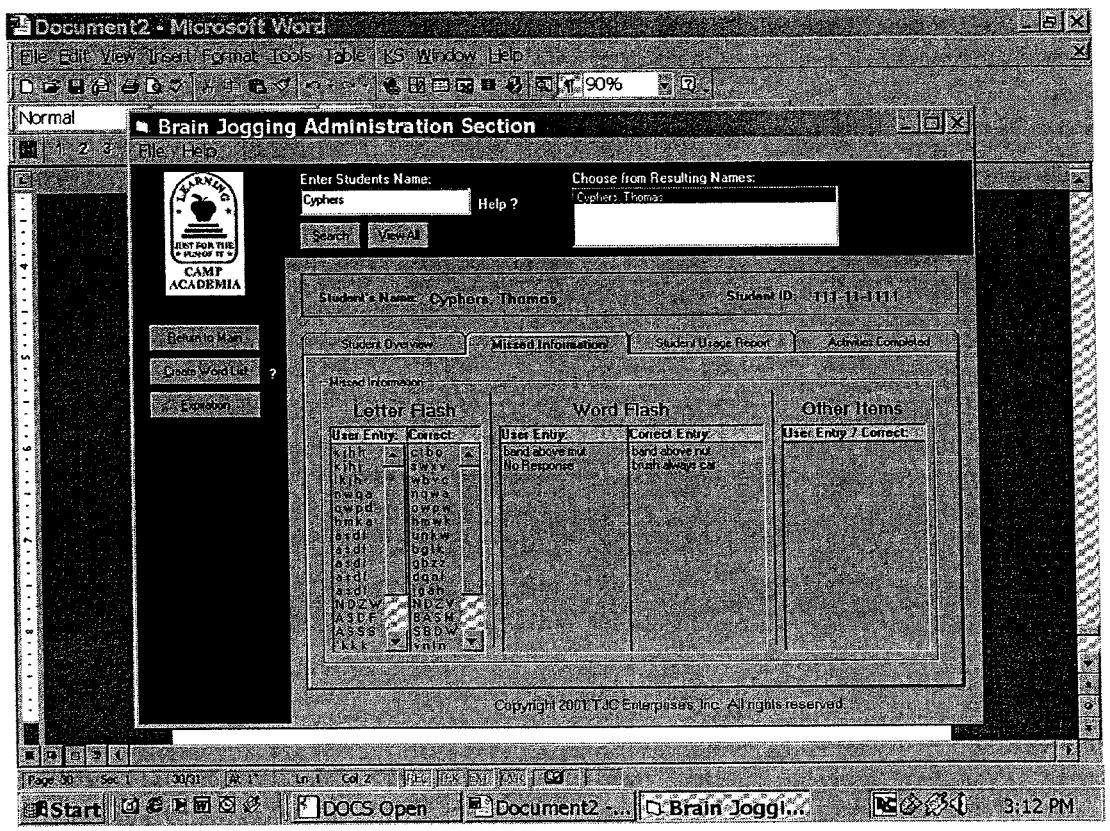
Figure 5J:
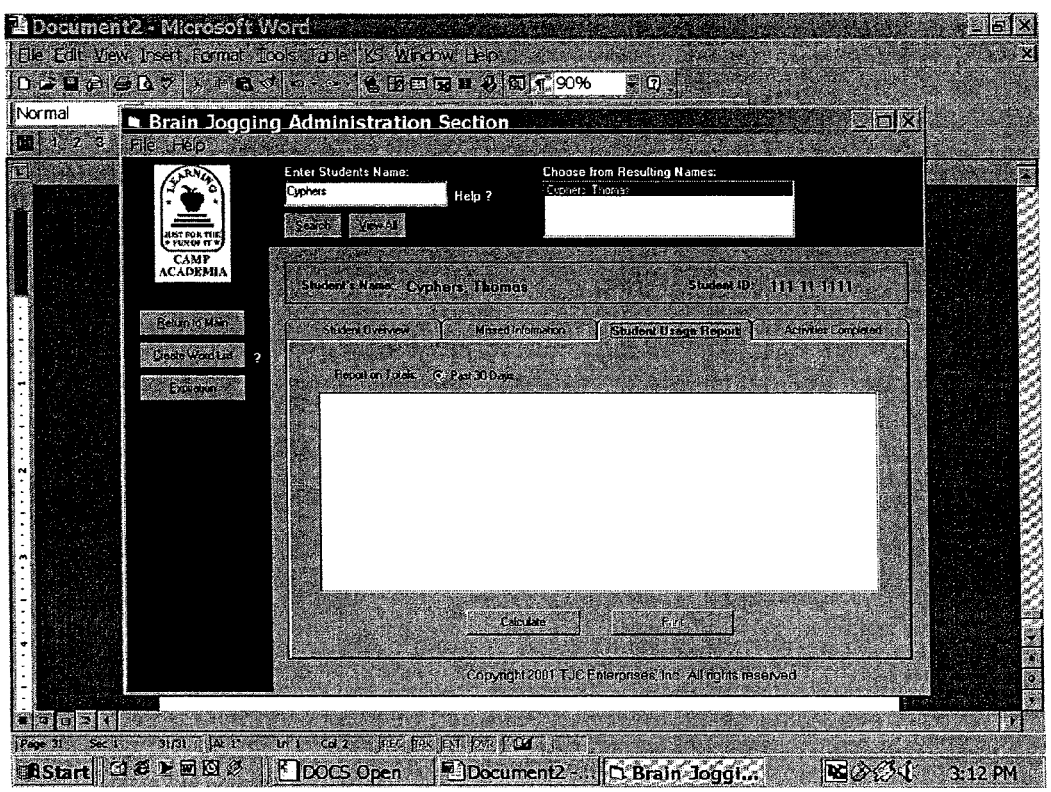
Figure 5K:
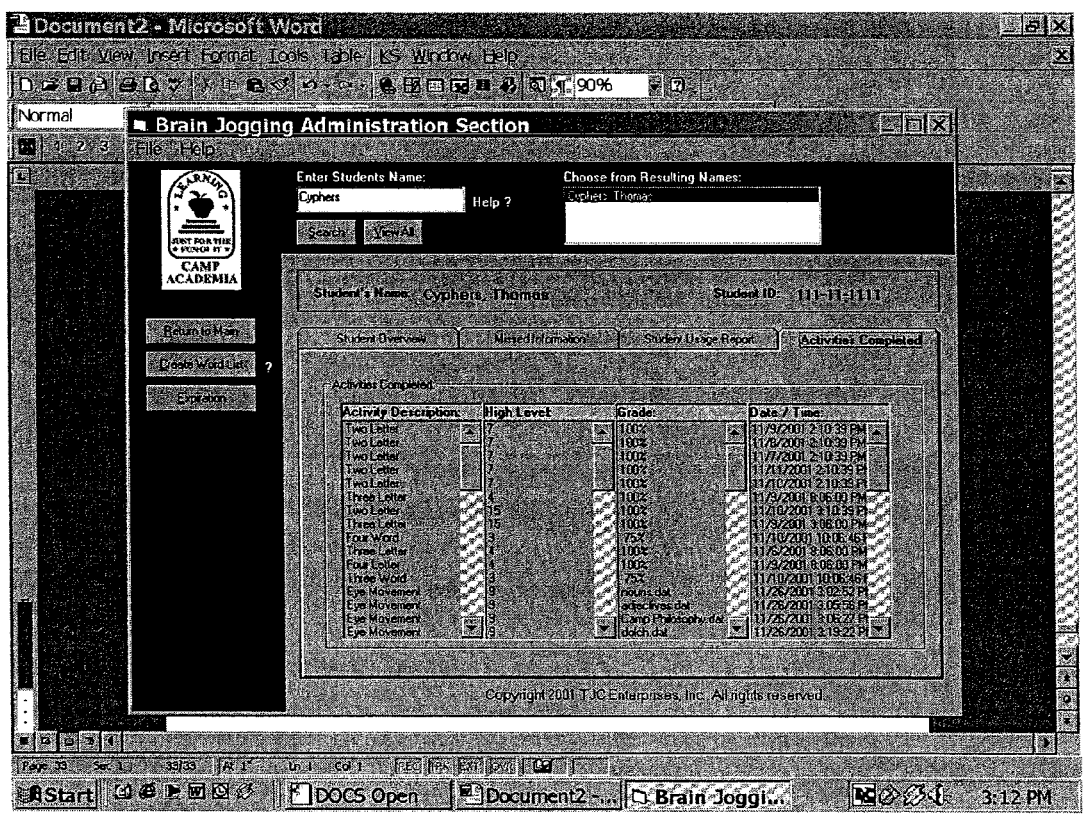

The top of the interface shown in FIG. 5(G) illustrates options for searching student records. As shown in FIG. 5(H), a person may input the student's name in order to retrieve that student's records. The user can view the information shown in a "Student Overview" tab as shown in FIG. 5(H), the information shown in the "Missed Information" tab as shown in FIG. 5(I), the information shown in a "Student Usage Report" tab as shown in FIG. 5(J), or the information shown in an "Activities Completed" tab as shown in FIG. 5(K). In addition to searching by student's name, the brain jogging system 10 also allows the user to view all records and to select a user from a list.

Eye Movement Activity

Figure 6A:
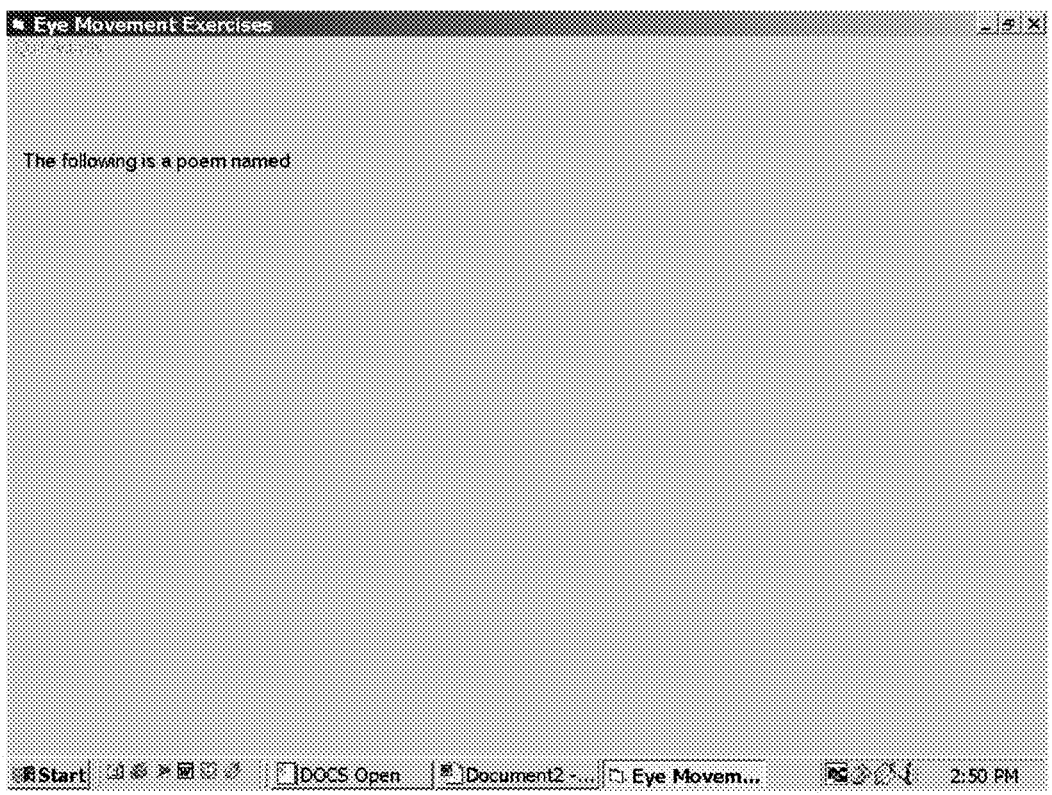
FIGS. 6(A) to 6(D) provide an example of interfaces displayed during eye movement exercises.
Figure 6B:
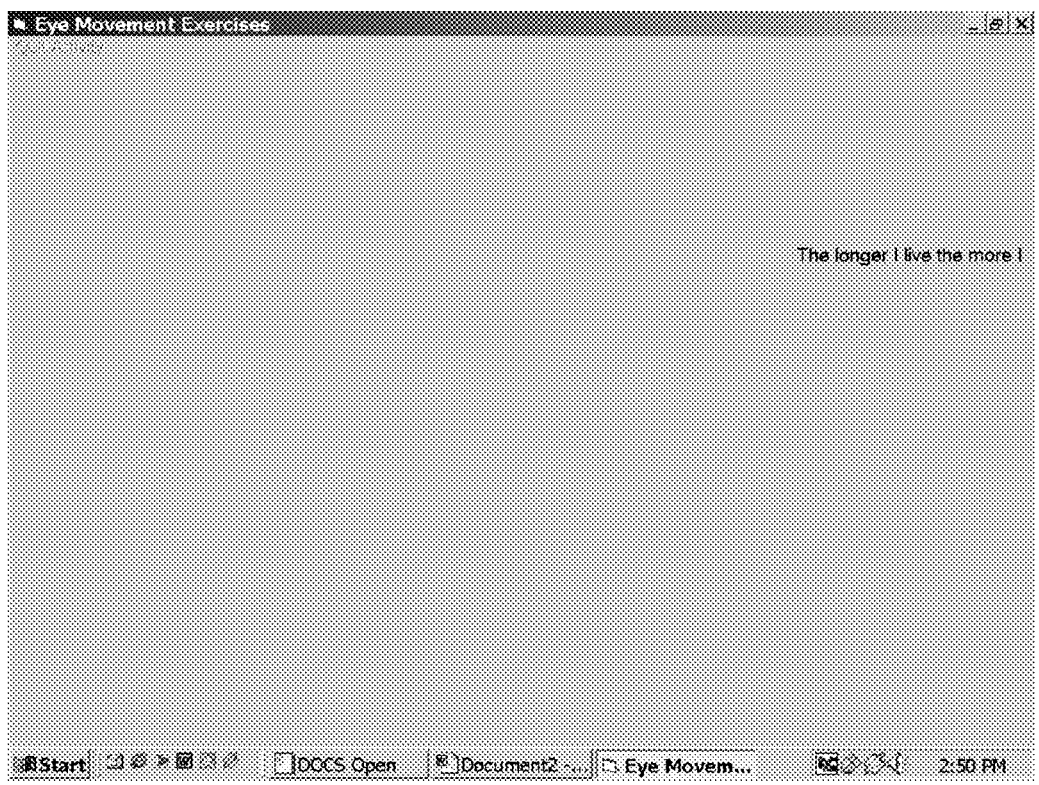
Figure 6C:
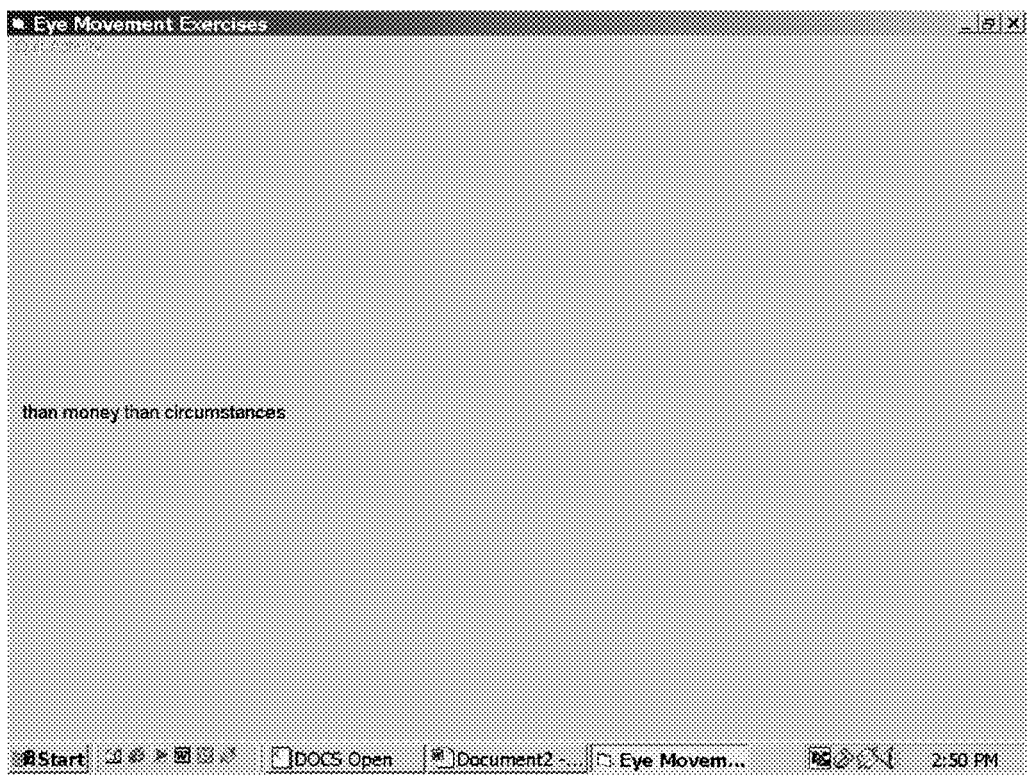
Figure 6D:
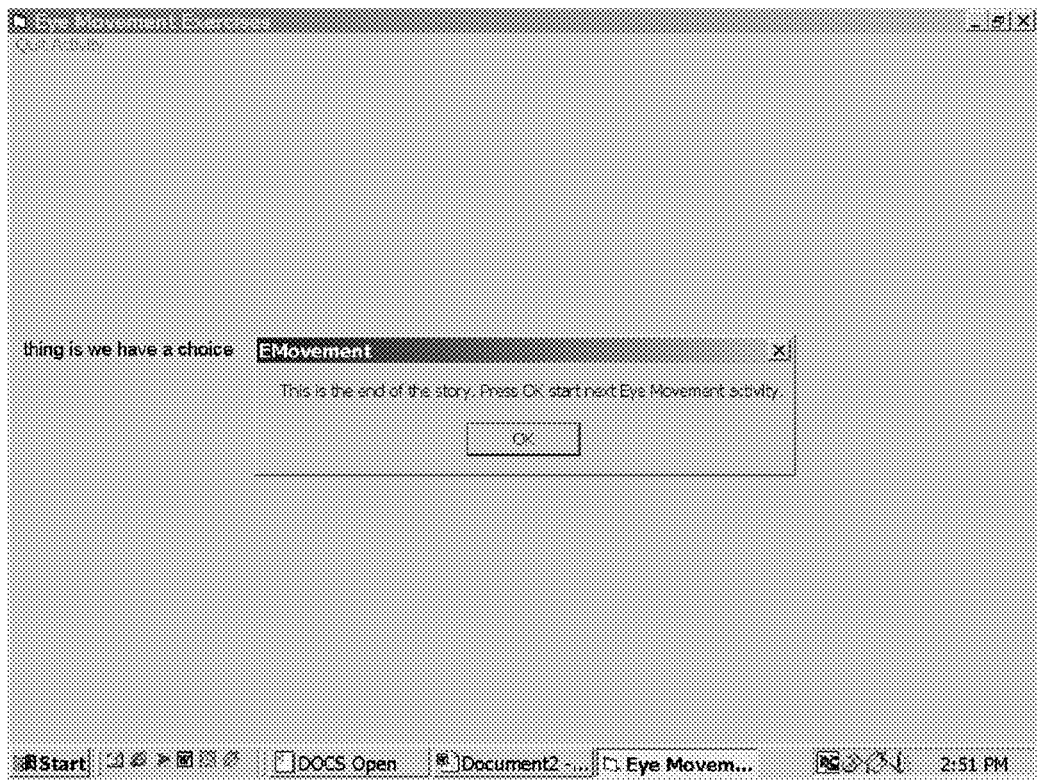
Figure 7A:
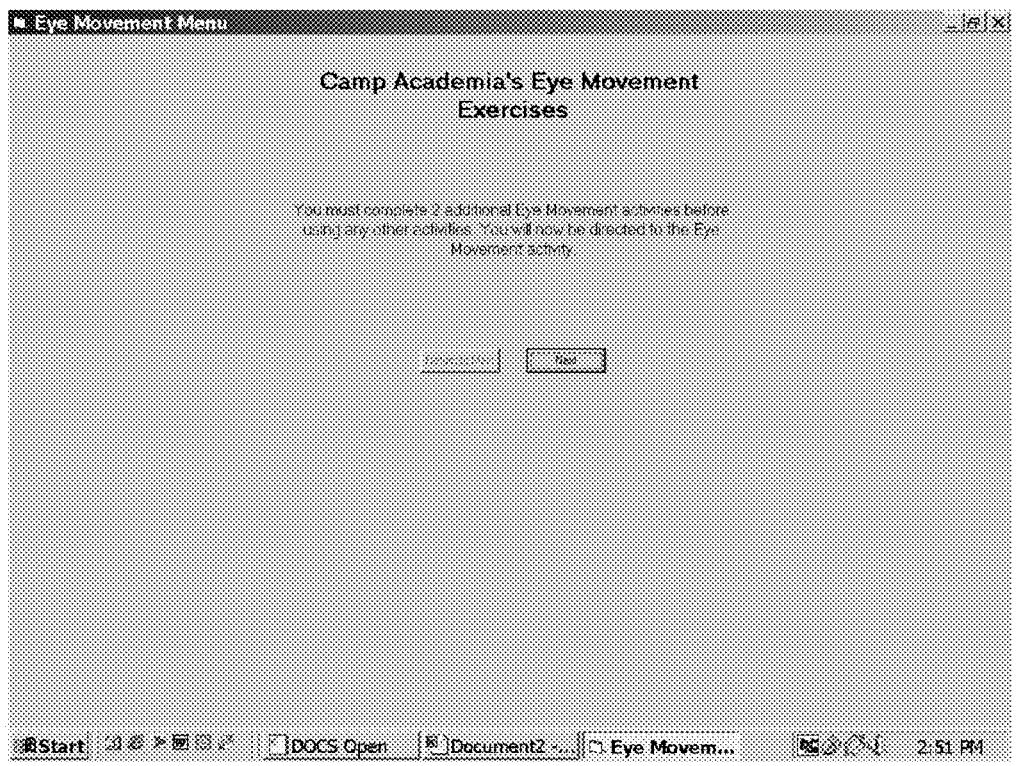
FIGS. 7(A) and 7(B) illustrate additional interfaces shown during eye movement exercises.
Figure 7B:
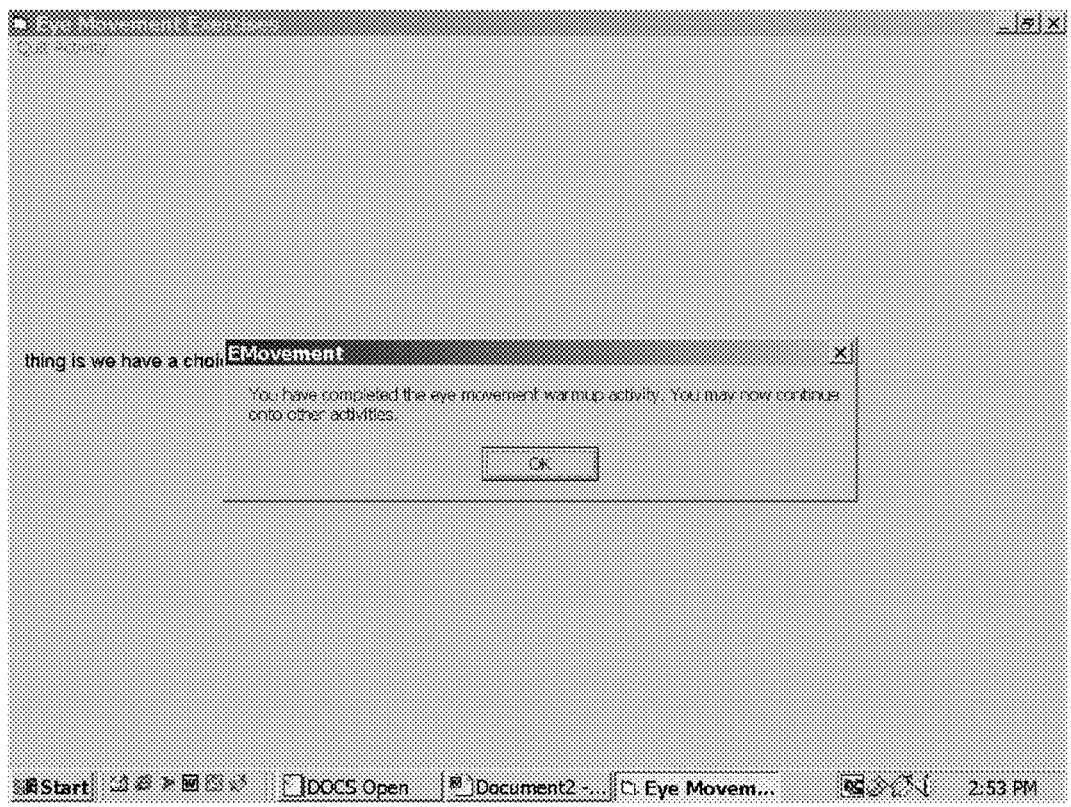
Figure 8:
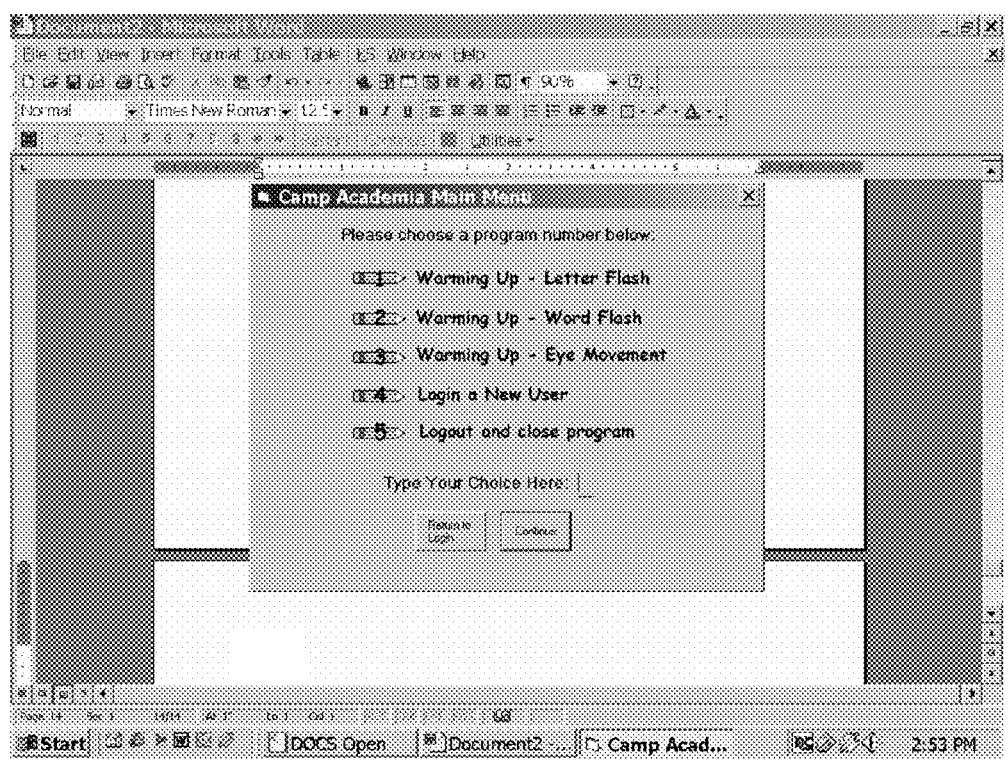
FIG. 8 provides a main menu presented by the system.

All students, regardless of whether they are new students or continuing students, are required to perform three eye movement exercises before proceeding to other activities. FIGS. 6(A) to 6(D) provide an example of eye movement exercises. As shown in FIG. 6(A), the eye movement exercises display a word or a group of words on the screen and then vary the words and the position of the words on the screen. The user then recites the first letter and last letter in the word or set of words displayed. For instance, for the set of words displayed in FIG. 6(A), the user would recite "T" and "D." FIG. 6(B) illustrates the placement of a different set of words at a different position on the screen and FIG. 6(C) shows yet another set of words placed at yet another location on the screen. FIG. 6(D) is an interface informing the user that the eye movement exercise has ended. FIGS. 7(A) and 7(B) are interfaces shown at the completion of the first eye movement exercise and third and final eye movement exercise, respectively. After the user has completed three eye movement exercises, the user can then proceed to the main menu, which is shown in FIG. 8.

An instructor or other suitable person grades the eye movement exercises according to one aspect of the invention as the user verbalizes his or her response. The eye movement exercises, as well as the letter flash, word flash, and any other exercises available through the system 10, may be graded using voice recognition, such as but not limited to Dragon Naturally Speaking® from ScanSoft, Inc. of Peabody, Mass. Thus, when the user verbalizes his or her response, the system 10 has a microphone for detecting the response and for determining what the user said. One benefit of using voice recognition is that the system 10 can monitor both the accuracy and also the timing.

In one embodiment, the eye movement activity is performed at different speeds similar to that descried for the letter flash and word flash activities. The student or instructor sets the speed or the brain jogging system uses voice recognition to automatically adjust the speed based on the user's progress. The speed is increased until the user becomes frustrated or is unable to successfully perform the eye movement activity. In another embodiment, the brain jogging system uses the slowest speed for all eye movement exercises.

The content of the words/text displayed during the eye movement exercises can vary based on the identity of the student, the skills the student is trying to master, or the student's diagnosed disorder. In one embodiment, the content of the eye movement exercises including rhyming words and rhyming prose. The use of rhyming words and rhyming prose appear to assist students in developing language processing skills. As an example, an eye movement exercise using rhyming words displays a first word ("cat") on the left-hand side of the screen and another word that rhymes with the first word ("hat") on the right-hand side of the screen. As a further example, an eye movement exercise using rhyming prose displays a first phase ("hickory dickery dock") on the left-hand side of the screen and another phrase that rhymes with the first phrase ("the mouse ran up the clock") on the right-hand side of the display device. The student is instructed to verbalize the word or phase that appears on the left-hand side of the display device and then the word or phase that appears on the right-hand side of the display device.

In another embodiment, the content of the eye movement exercises progresses so that the student first is presented with prefixes and suffixes, next is presented with Latin/Greek roots and finally is presented with words built on the previously presented prefixes, suffixes and roots. This type of content appears to assists those with dyslexia. In this embodiment, the student is instructed to "say it, spell it, say it." For example, if the prefix "re" is displayed on the left-hand side of the display device and the prefix "pro" is displayed on the right-hand side of the display device, then the student should respond with "re, 'r', 'e', re, pro 'p,' 'r,' 'o,' pro."

Letter Flash Activity

Figure 9A:
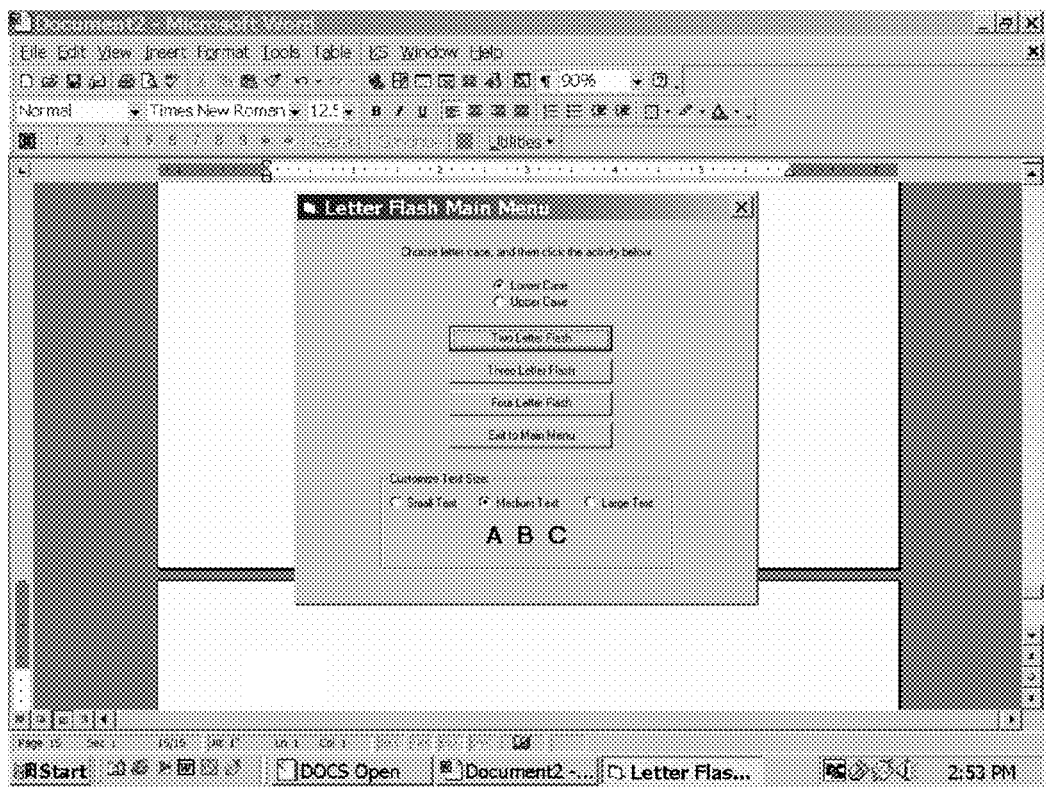
FIGS. 9(A) to 9(C) illustrate interfaces shown during a letter flash exercise.
Figure 9B:
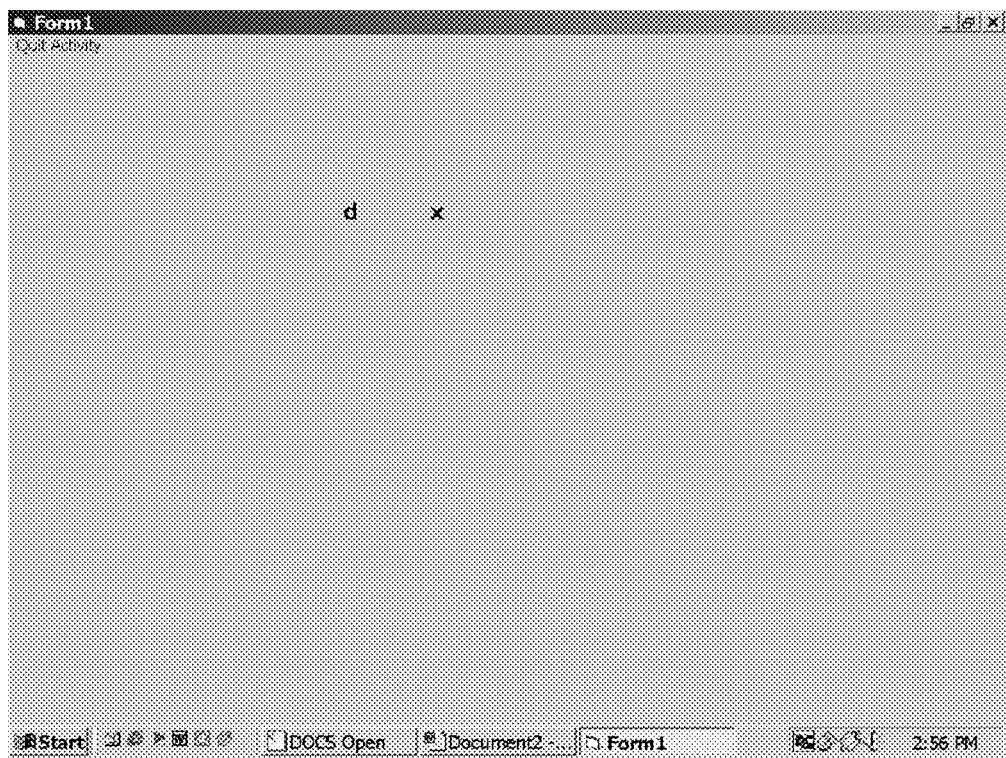
Figure 9C:
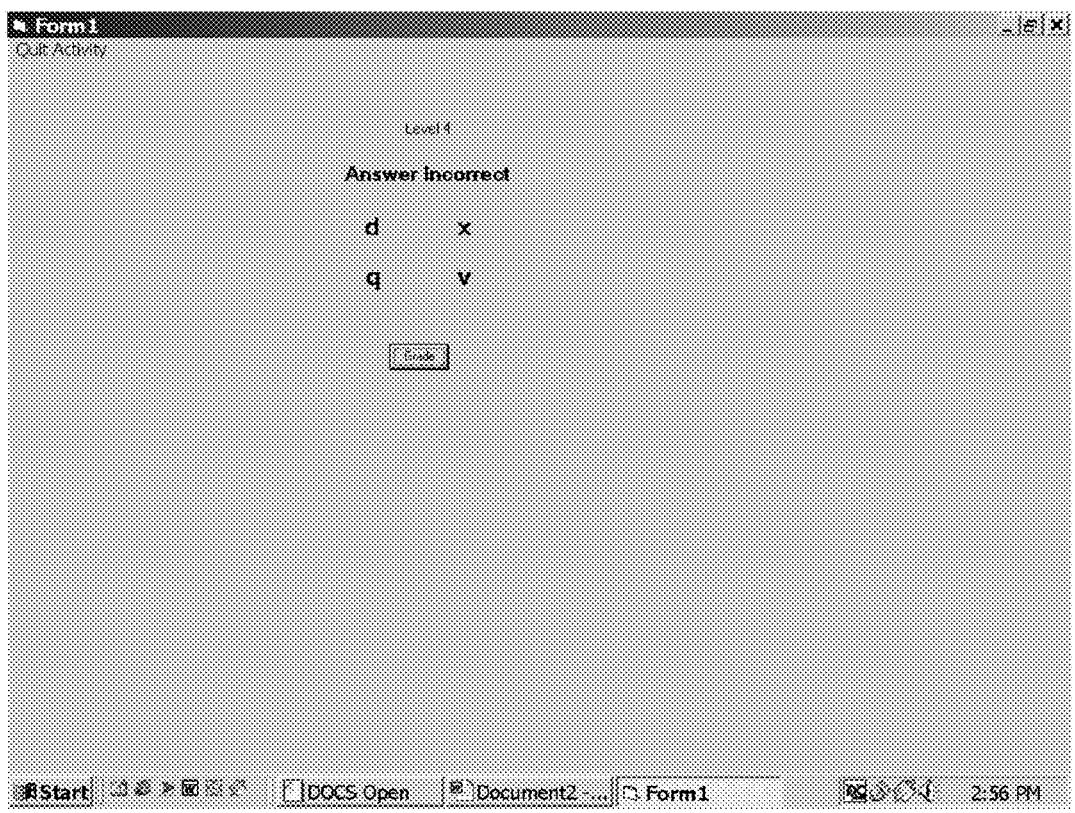

FIG. 9(A) is an example of an interface for a letter flash main menu. From this menu, a user can select between the different types of letter flash exercises. The user can select between lower case and upper case letters, as well as between a two, three, or four-letter flash. Furthermore, the user can select between different size fonts, such as between small text, medium text, or large text. It should be understood that systems and methods according to the invention might incorporate additional numbering of letters beyond just four letters. FIG. 9(B) is an example of an interface presented during a two-letter flash exercise. The letters are displayed for a period of time and then afterwards the user must input the letters by typing the letters on a keyboard or inputting the letters via another type of input device. FIG. 9(C) illustrates an interface informing the user that they entered the incorrect answer. As shown in this figure, the letters "d" and "x" were displayed for the period of time and the user incorrectly typed in the letters "Q" and "V".

As shown in FIG. 9(B), the letters can be flashed using lower case. The inventor has determined that by flashing the letter in lower case and requiring the user to locate the corresponding upper case letter on a keyboard, a student is required to process the letters, not just match the letters.

As described above, the letter flash exercises are presented to the student at increasingly faster speeds. A student progresses from two-letter flash exercises to three-letter flash exercises once the student successfully completes the two-letter flash exercises three times at the highest speed. A student progresses from three-letter flash exercises to four-letter flash exercises once the student successfully completes the three-letter flash exercises three times at the highest speed. If longer letter flashes are used, then the student progresses to the longer letter flashes in a similar manner.

Word Flash Activity

Figure 10A:
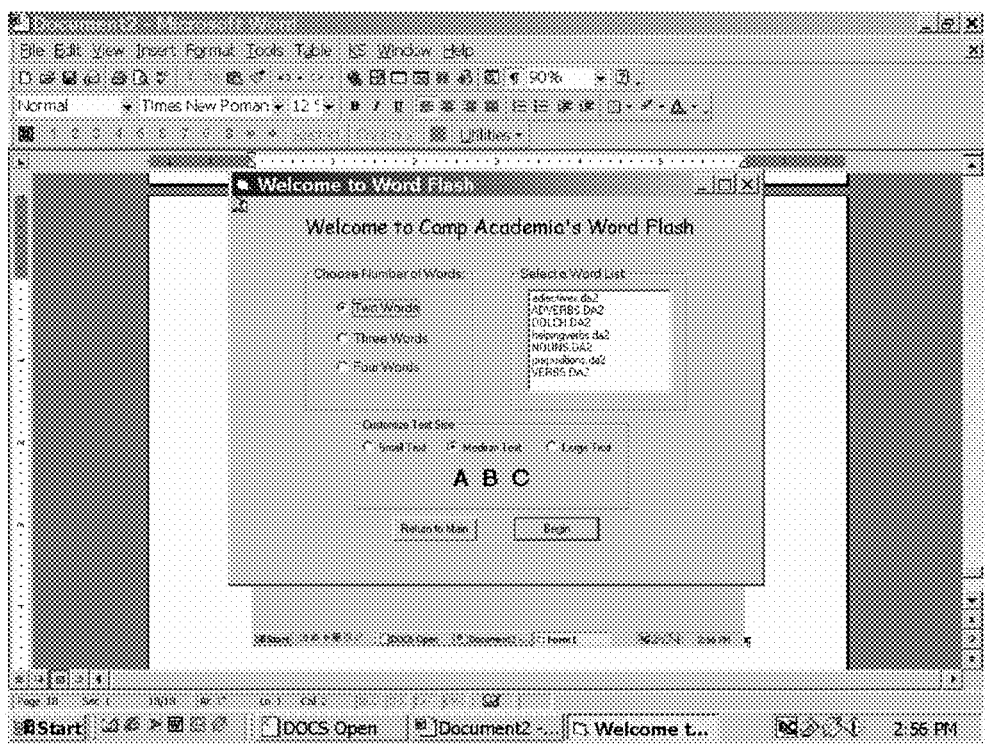
FIGS. 10(A) to 10(E) are interfaces illustrating a word flash exercise.
Figure 10B:
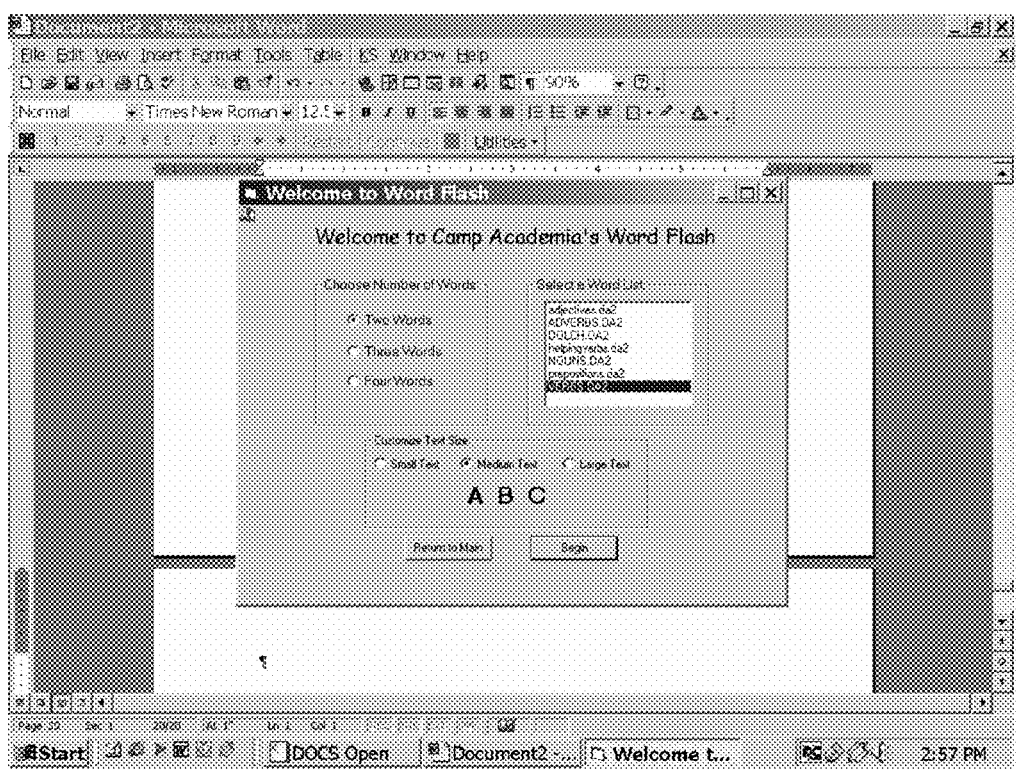
Figure 10C:
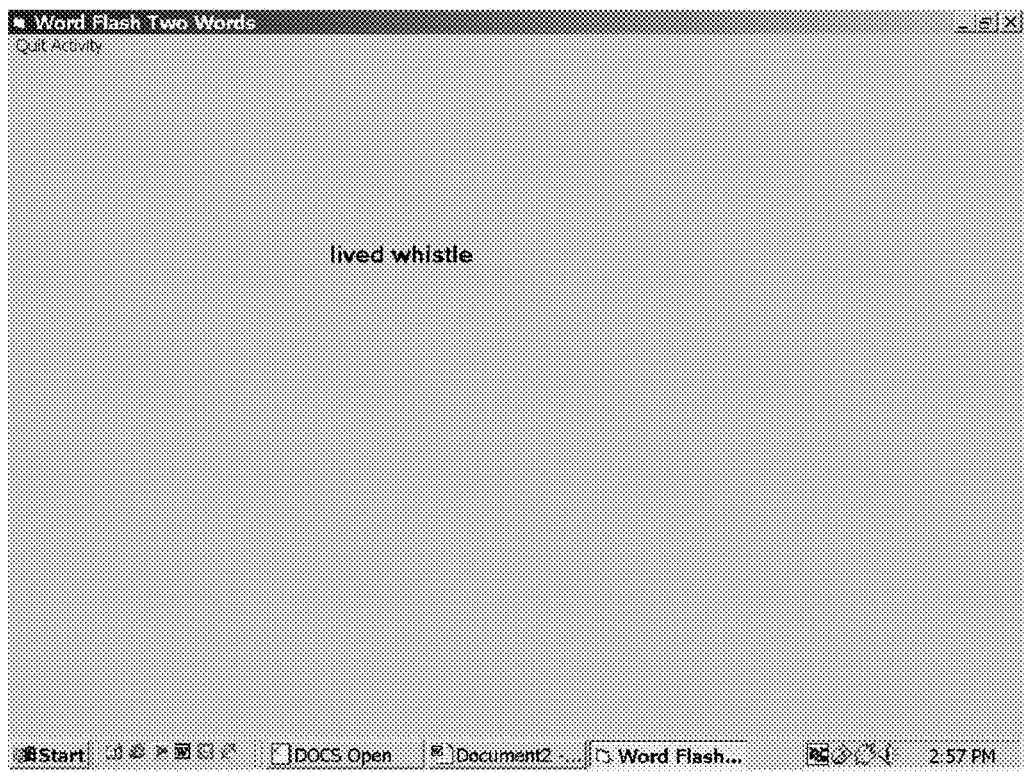
Figure 10D:
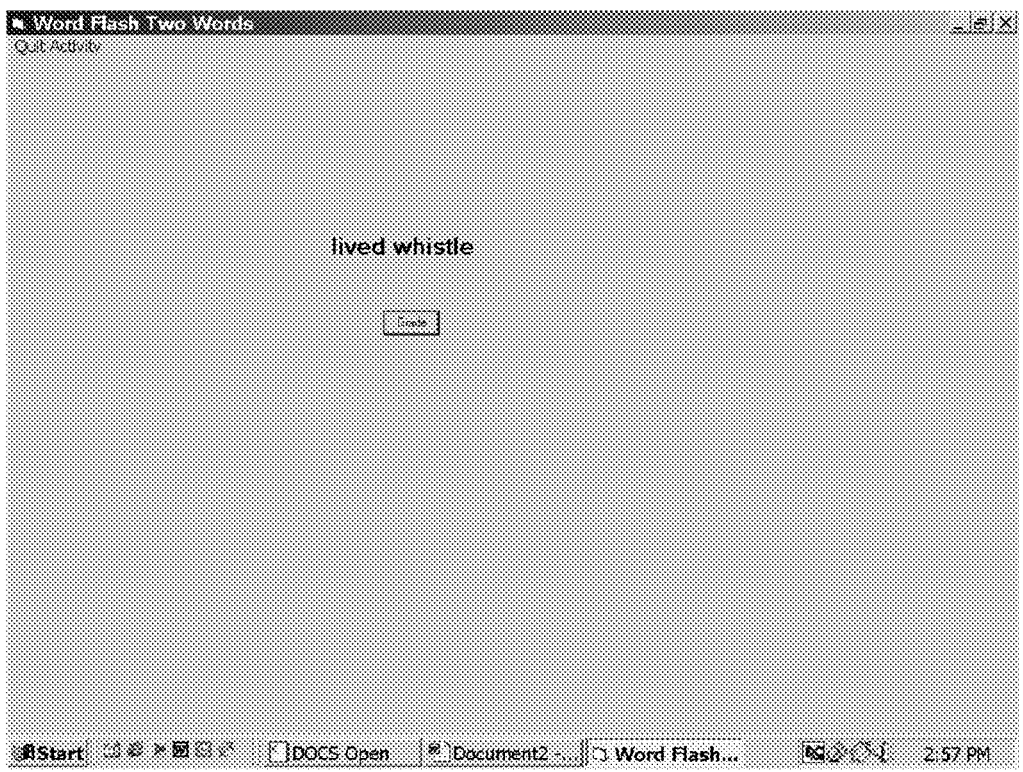
Figure 10E:
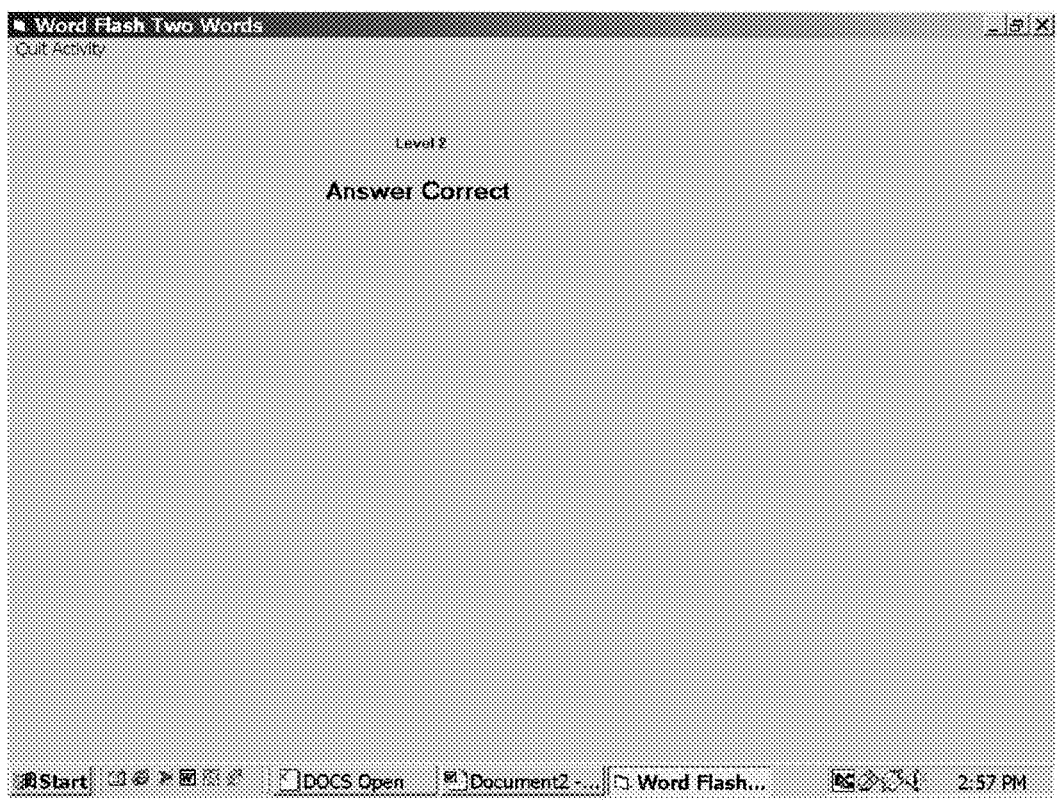

FIG. 10(A) is an example of a word flash menu. From this menu, the user can select between two, three, or four word flash and can also select a word list. The user can also select small text, medium text, or large text. For instance, FIG. 10(B) illustrates the selection of two-word flash in medium text from the "VERBS" word list. FIG. 10(C) then illustrates an example of a word flash consisting of two words, namely "lived whistle." After the words are displayed for a brief period of time, the user then types in two words, as shown in FIG. 10(D). After the user is done entering the words, the user selects the "Grade" button to discover whether the user answered the question correctly. FIG. 10(E) illustrates an interface informing the user that they answered correctly.

The words displayed during the word flash exercises can vary based on the identity of the student, the skills the student is trying to master, or the student's diagnosed disorder. In one embodiment, the words are chosen so that the words have a connection to the student's everyday life. The use of words that have a connection to the student's everyday life appears to assist students who have suffered a stroke. As an example, a word flash exercise for a student that has a gray cat as a pet could use the words "gray cat" for a two-word flash exercise.

As described above, the word flash exercises are presented to the student at increasingly faster speeds. A student progresses from two-word flash exercises to three-word flash exercises once the student successfully completes the two-word flash exercises three times at the highest speed. A student progresses from three-word flash exercises to four-word flash exercises once the student successfully completes the three-word flash exercises three times at the highest speed. If longer word flashes are used, then the student progresses to the longer word flashes in a similar manner.

Results

The effectiveness of the brain jogging system 10 may be analyzed using various methods. For example, neuro-psych testing and/or a standardized test such as the Woodcock Johnson 111, Tests of Achievement may be used before, after and/or during use of the system 10. One particular individual using the system 10 was tested by a nationally known psychologist, Dr. Edna Copeland, using the Woodcock Johnson test and then retested a week following sessions with the system 10. The system 10 produced significant improvements, including a 17% increase in reading comprehension and a 37% increase in reading speed.

A second individual was tested in kindergarten by a neuropsychiatrist and found to have severe issues. The kindergarten teacher recommended that the student attend a school for special learning disabilities. This second individual used the system 10 and was retested both by a public university and then by a private psychologist approximately a year later. This second individual gained drastic improvements in areas related to dyslexia.

Parents comments and observations are also very enlightening. One set of parents commented that their child was doing great and scored several 100s on tests and is just really ecstatic. The brain jogging itself, of course, maintains scores from the exercises which allows someone to monitor the progress of an individual before, during, and after exercises. The school, employer, or other such institution or organization may also make observations, both objective and subjective. For example, the system 10 may improve grades on report cards, improve job evaluations, etc.

EXAMPLES

The following examples will serve to further illustrate the present invention without constituting any limitation thereof. On the contrary, it is to be clearly understood that resort may be had to various embodiments, modifications and equivalents thereof which, after reading the description herein, may suggest themselves to those skilled in the art without departing from the spirit of the invention.

Dyslexia

The brain jogging system can be used with persons with dyslexia. Persons suffering from dyslexia suffer from a reading disability resulting from an inability to process symbols, such as letters, disturbance in the ability to read and the ability to use language (Merriam Webster's Medical Dictionary 1995).

Figure 11:
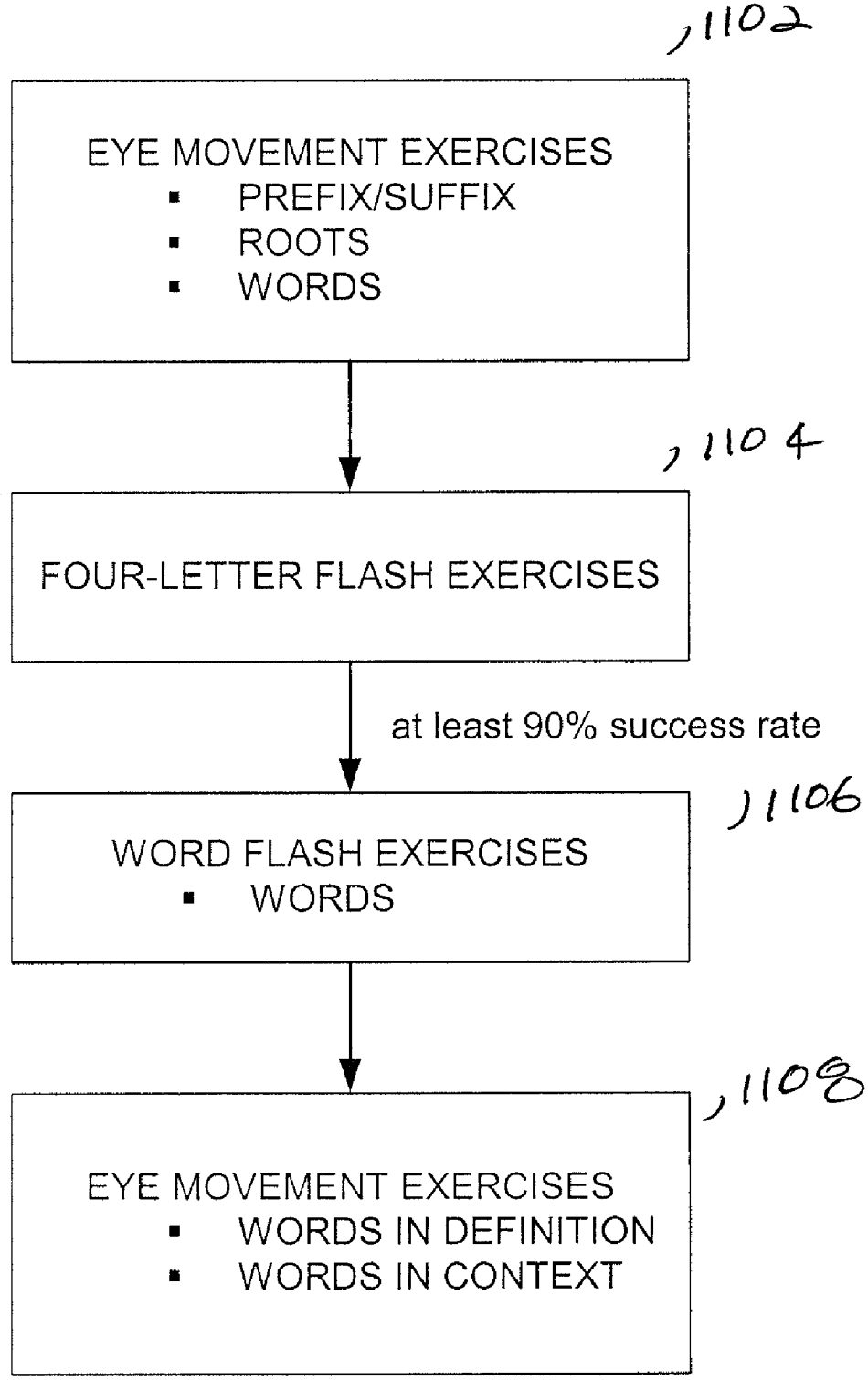
FIG. 11 is a flow chart illustrating an exemplary method for using the exercises provided by the system.

FIG. 11 represents an exemplary method for using the brain jogging system for dyslexia. The method begins at step 1102 with the required eye movement activity. The first eye movement activity presents words, phrases, or word components, such as prefixes and suffixes, to the student. The student is instructed to "say it, spell it, say it." Thus, the student verbalizes the first word, phrase or word component displayed on the far left-hand side of the display screen, spells the word, phrase or word component displayed on the left-hand side of the display screen, and then again verbalizes the word, phrase or word component displayed on the left-hand side of the display screen. This process is repeated for the word, phrase or word component displayed on the right-hand side of the display screen. A number of words, phrases or word components are presented to the student in this first eye movement activity. This activity is preferably repeated two more times before the user proceeds to other activities. As the student gains proficiency in this activity, the student builds skills that assist the student in mastering the next level of eye movement activity.

The second level of the eye movement activity presents Greek and/or Latin roots to the student. Again, the student is instructed to "say it, spell it, say it." Thus, the student verbalizes the root displayed on the left-hand side of the display screen, spells the root displayed on the left-hand side of the display screen, and then again verbalizes the root displayed on the left-hand side of the display screen. This process is repeated for the root displayed on the right-hand side of the display screen. A number of roots are presented to the student in this eye movement activity.

The third level of eye movement activity presents words to the student that are comprised of the prefixes, suffixes and roots presented in the previous two levels of eye movement exercises. Again, the student is instructed to "say it, spell it, say it." Thus, the student verbalizes the word displayed on the left-hand side of the display screen, spells the word displayed on the left-hand side of the display screen, and then again verbalizes the word displayed on the left-hand side of the display screen. This process is repeated for the word displayed on the right-hand side of the display screen. A number of words are presented to the student in this eye movement activity.

As described above in connection with step 1102, the student is instructed to perform three eye movement activities before proceeding to any other activities. Once the user has completed the three eye movement activities, the method proceeds to step 1104, where the student preferably proceeds to perform four-letter flash exercises. In some circumstances the user may proceed to perform two or three-letter flash exercises in step 1104. Regardless of the length of the letter flash, the letters are incongruent. Once the user achieves a threshold success rate, typically three consecutive times on three consecutive days of at least 90% in step 1104, then the method proceeds to step 1106. If the user does not achieve the threshold success rate, then the method does not proceed to step 1106 and the user is instructed to perform another eye movement activity followed by additional letter flash exercises.

In step 1106, a set of word flash exercises is performed. The words used in the word flash exercises are the same as the words previously used in the eye movement exercises. The method then proceeds to step 1108. Over time, the student progresses from two to three to four-word flash exercises. To progress to the next higher level the student must achieves a threshold success rate, typically 90% success for three consecutive times on three consecutive days.

In step 1108, additional sets of eye movement exercises are performed. The first set of eye movement exercises displays the words previously used in the eye movement and word flash exercises in definition. The word appears on the left-hand side of the display screen and the definition for the word appears on the right-hand side of the display screen. For example, "program" is displayed on the left-hand side of the display screen and a definition, such as "performance or show" is displayed on the right-hand side of the display screen. The student is instructed to verbalize the word, spell the word, verbalize the word again and then verbalize the definition.

The second set of eye movement exercises displays the words previously used in context. The word appears on the left-hand side of the display screen as part of the subject of a sentence. The predicate of the sentence appears on the right-hand side of the display screen. For example, the phrase "The program" is displayed on the left-hand side of the display device and the phrase "is scheduled for tomorrow" is displayed on the right-hand side of the display screen. The student is instructed to verbalize the complete subject and then verbalize the complete predicate of the sentence.

The method of FIG. 11 illustrates a building process. The process begins with the presentation of word components and words in step 1102, reinforces the words in step 1106 and provides definition and context for the words in step 1108.

The recommended frequency of use for a student with dyslexia is a minimum of twice a day, every day for seven to ten minutes. It has been found that a dyslexic student who achieves a success rate of at least 90% on four-letter flash and demonstrates fluent speech during the eye movement activities can read fluently.

MIID

The brain jogging system can be used with persons with MIID. Persons suffering from MIID have below average intellectual functions (e.g. IQ below 65), as well as deficits in adaptive behavior. The preferred use of the brain jogging system for a student with MIID focuses on eye movement and letter flash activities. Once the letter flash activities are mastered, then the student proceeds to eye movement activities using rhyming words and functional words and symbols, such as "restroom" and the symbol for restroom. Word flash exercises focus on the words that the students are using in class for reading and spelling exercises.

The recommended frequency of use for a student with MIID is a minimum of three times a day. For example, in a classroom setting, the sessions could occur at the beginning of the day, after lunch and at the end of the day. It is recommended that the student continue using the brain jogging system over school breaks. It has been found that once an MIID student achieves a success rate of at least 90% on two-letter flash that significant improvement in reading and spelling occurs.

An MIID student uses the brain jogging system while at school throughout the school year. The student uses the brain jogging system an average of two times a day to perform three eye movement exercises, followed by two-letter and three-letter flash exercises. The student routinely achieves between 50% and 65% success rate for the letter flash exercises. In some instances the student achieves in excess of 70%. This student's standardized test scores improve from an initial score of 27 to a mid-year score of 52 and an end of the year score of 58. The standardized test in this example is the BLT (Basic Literacy Test) administered in the Georgia public schools during the 2002-2003 school year.

Autism

The brain jogging system can be used with persons with autism. Autism is a developmental disorder that affects the brain's normal development of social and communication skills. The preferred use of the brain jogging system with an autistic student includes using questions and answers in the eye movement exercises. For example, the question "Is Mary happy today?" is displayed on the left-hand side of the screen and the answer "Mary is happy today." is displayed on the right-hand side of the screen. In addition content that reflects a topic of interest to the student, such as cars or trains, is used in the brain jogging exercises. The recommended frequency of use for a student with autism is a maximum of three times a day.

Seizures

The brain jogging system can be used with persons suffering from seizure disorders. the preferred use of the brain jogging system for seizures focuses on letter flash since it is believed that the letter flash resets the brain wave patterns. The content of the brain jogging exercises is tailored to the individual student and in particular to the area of the brain the seizure affects. For example, the content for a student that has seizures that affect the math area of the brain includes words from the student's math textbook. The recommended frequency of use for a student suffering from seizures is two to four times a day.

A student suffers from seizures that last one or two minutes and may not be perceptible to the student or to the student's teachers ("silent seizures"), other than the student becomes silent and disengaged. When the student regains composure, the student has no recollection of what occurred prior to the seizure. The student uses the brain jogging system an average of four times a day for approximately ten minutes each time to primarily perform four-letter flash exercises, although two and three-letter flash exercises are also performed. In addition, the student attends a special camp once a month that uses the brain jogging system. The student routinely achieves above a 50% success rate for the letter flash exercises. After several months of using the brain jogging system, the student's seizures appear to have stopped and the student no longer requires seizure medication.

Stroke

The brain jogging system can be used with persons who have suffered a stroke. It is recommended that a stroke victim begin each brain jogging session with eye movement exercises. The student is instructed to verbalize the first and last letter. If the student cannot verbalize the letters, then the instructor verbalizes the letters and encourages the student to join. Then the system proceeds to additional eye movement exercises that use rhyming words and rhyming phrases, as well as pictures and definitions and words from the student's prior vocabulary. Once the student progresses to the word flash activity, the content of the word flash activity should include words that are relevant to the student's everyday life. The recommended frequency of use for a student having suffered a stroke is as often as possible until the student begins to improve, typically five sessions per day.

A student who had suffered a stroke could not properly identify a tomato or the red color of the tomato. The student uses the brain jogging system for an average of five times a day for approximately 45 minutes each time to perform eye movement exercises verbalizing the first and last letters, eye movement exercises using objects, eye movement exercises using phrases from the student's prior vocabulary, and letter flash exercises. The student routinely achieves a 50-70% success rate for the two-letter flash exercises. After a week of using the brain jogging system, the student can properly identify the tomato and the red color of the tomato.

Enuresis

The brain jogging system can be used with persons suffering from enuresis. The preferred use of the brain jogging system with a student with enuresis focuses on eye movement and letter flash activities. The recommended frequency of use for a student with enuresis is three to four times a day.

A student suffering from enuresis uses the brain jogging system an average of once a day to perform multiple exercises, primarily four-letter flash exercises, although two-word flash exercises are also performed. When the student achieves above a 90% success rate for the four-letter flash exercise, the student does not suffer from enuresis. Once the student stops using the brain jogging system, the student again suffers from enuresis.

Tourette Syndrome

The brain jogging system can be used with persons suffering from Tourette syndrome. The preferred use of the brain jogging system with a student with Tourette syndrome focuses on eye movement and letter flash activities. The recommended frequency of use for a student with enuresis is three to four times a day.

The foregoing description of the preferred embodiments of the invention has been presented only for the purpose of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated.

What is claimed is:

1. A method for the treatment of autism, comprising:
providing a first eye movement activity to a user with autism wherein the user with autism responds to a display of visual flash stimuli by verbalizing at least a portion of the visual flash stimuli during the first eye movement activity, the first eye movement activity comprising:
providing a letter flash activity to the user, wherein a display of letters is presented to the user in lower case and the user is instructed to input the letters displayed in upper case into a computer system;
providing a word flash activity to the user comprising a display of words, wherein the user is instructed to respond to the display of words by inputting the words into the computer system if the user achieves a predetermined success threshold for the letter flash activity; and
providing a second eye movement activity comprising at least one of:
displaying a first word and a definition for the word; and
displaying a first word and one or more rhyming words that rhyme with the first word.

2. The method of claim 1, wherein the letter flash activity displays one to four letters.

3. The method of claim 1, wherein the predetermined success threshold is correctly inputting at least 90% of the displayed letters.

4. The method of claim 1, further comprising:
directing the user to perform another eye movement activity and another letter flash activity if the user does not achieve the predetermined success threshold for the letter flash activity.

5. The method of claim 1, wherein a first word and a definition for the word are displayed and wherein displaying each word and the definition for the word comprises displaying the word on one side of a display screen and the definition on the other side of the display screen.

6. The method of claim 1, wherein a first word and one or more rhyming words that rhyme with the first word are displayed and wherein the user is instructed to respond to the display of each first word and one or more rhyming words in the second eye movement activity by verbalizing the first word and the one or more rhyming words.

7. The method of claim 1, wherein the user is instructed to respond to the display of each word and definition or one or more rhyming words in the second eye movement exercise by verbalizing the word and the definition or one or more rhyming words for the word, or by verbalizing individual letters within the word or words displayed.

8. The method of claim 1, wherein the effectiveness of the method is analyzed by administering one or more of neuro/psychological tests and/or a standardized test.

9. The method of claim 8, wherein the standardized test is the Woodcock-Johnson® Tests of Achievement.

10. The method of claim 1, wherein the first or second eye movement activity includes the use of questions and answers.

11. The method of claim 1, wherein content of the eye movement activity, letter flash activity, and/or word flash activity reflects a topic of interest to the user.

12. The method of claim 1, wherein the method is administered 1 to 3 times per day.

13. The method of claim 1, wherein the user with autism is instructed to verbalize a response which is detected by a system for detecting the response and determining what the user said.

14. The method of claim 13, wherein the system for detecting the response and determining what the user said is a voice recognition system.

15. The method of claim 1, wherein the first eye movement activity requires the user to identify the first letter on the right of the screen and last letter on the left of the screen by verbalizing the letters.

16. The method of claim 1, wherein the user is required to perform a set number of eye movement activities before proceeding to other activities.

17. The method of claim 16, wherein the set number of eye movement activities is three.

18. The method of claim 1, wherein to complete the first or second eye movement activity the user is required to say the word, spell the word, and then say the word again.

19. A computer-implemented method for the treatment of autism, comprising:
- providing an eye movement activity to a user with autism wherein the user with autism responds to a display of visual flash stimuli by verbalizing at least a portion of the visual flash stimuli during the eye movement activity, the eye movement activity comprising:
  - displaying a first series of visual flash stimuli to the user, the first series of visual flash stimuli comprising word prefixes and suffixes, wherein a selected prefix is flashed on one side of a display screen and a selected suffix is flashed on the other side of the display screen, wherein the computer generates the word prefixes and suffixes and provides them to the display screen;
  - displaying a second series of visual flash stimuli to the user, the second series of visual flash stimuli comprising word roots, wherein a first selected word root is flashed on the one side of the display screen and a second selected word root is flashed on the other side of the display screen, wherein the computer generates the first selected word root and the second selected word root and provides them to the display screen;
  - displaying a third series of visual flash stimuli to the user, the third series of visual flash stimuli comprising words that include prefixes, suffixes and roots of the word, wherein a first selected word that comprises the selected prefix and the first selected word root is flashed on the one side of the display screen and a second selected word that comprises the selected suffix and the second selected word root is flashed on the other side of the display screen, wherein the computer generates the words that include prefixes, suffixes, and roots of the word and the first selected word that comprises the selected prefix and the first selected word root and the second selected word that comprises the selected suffix and the second selected word root and provides them to the display screen; and
  - displaying a fourth series of visual flash stimuli to the user, the fourth series of visual flash stimuli comprising word prefixes and suffixes wherein a selected prefix or suffix is flashed on one side of a display screen and the meaning of the selected prefix or suffix is flashed on the other side of the display screen, wherein the computer generates the word prefixes and suffixes and the meaning of the selected prefix or suffix and provides them to the display screen.

20. The method of claim 19, further comprising providing a letter flash activity.

21. The method of claim 20, further comprising providing a word flash activity if the user achieves a predetermined success threshold for the letter flash activity.

* * * * *